United States Patent
Lin

(10) Patent No.: US 10,943,484 B2
(45) Date of Patent: Mar. 9, 2021

(54) LANE SCHEDULING METHOD, METHOD FOR OBTAINING LANE INFORMATION, VEHICLE, AND MANAGEMENT DEVICE

(71) Applicant: HUAWEI TECHNOLOGIES CO., LTD., Guangdong (CN)

(72) Inventor: Yangbo Lin, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 140 days.

(21) Appl. No.: 16/231,344

(22) Filed: Dec. 21, 2018

(65) Prior Publication Data

US 2019/0130755 A1 May 2, 2019

Related U.S. Application Data

(63) Continuation of application No. PCT/CN2016/087869, filed on Jun. 30, 2016.

(51) Int. Cl.
*G08G 1/16* (2006.01)
*G08G 1/0968* (2006.01)
*G06Q 50/30* (2012.01)
*H04W 4/44* (2018.01)
*G06Q 10/02* (2012.01)

(52) U.S. Cl.
CPC ............. *G08G 1/164* (2013.01); *G06Q 10/02* (2013.01); *G06Q 50/30* (2013.01); *G08G 1/09685* (2013.01); *G08G 1/096822* (2013.01); *G08G 1/167* (2013.01); *H04W 4/44* (2018.02)

(58) Field of Classification Search
CPC ............... G08G 1/164; G08G 1/09685; G08G 1/096822; G08G 1/167; G06Q 50/30; G06Q 10/02; H04W 4/44
See application file for complete search history.

(56) References Cited

U.S. PATENT DOCUMENTS

| | | | |
|---|---|---|---|
| 9,109,914 B2 * | 8/2015 | Arcot ................ | G06K 9/00818 |
| 9,869,561 B2 * | 1/2018 | Kroeller ............... | G08G 1/0145 |
| 2005/0096838 A1 | 5/2005 | Jung | |
| 2007/0005237 A1 * | 1/2007 | Needham ........... | G01C 21/3469 |
| | | | 701/414 |

(Continued)

FOREIGN PATENT DOCUMENTS

| | | |
|---|---|---|
| CN | 101630412 A | 1/2010 |
| CN | 101833855 A | 9/2010 |

(Continued)

*Primary Examiner* — Frederick M Brushaber
(74) *Attorney, Agent, or Firm* — Womble Bond Dickinson (US) LLP

(57) ABSTRACT

A lane scheduling method includes: receiving, by a management device, a road resource allocation request sent by a vehicle, where the road resource allocation request includes at least one road segment identifier, the road segment identifier is used to identify a logical road segment expected to be used by the vehicle, the logical road segment is a logical segment of a road on which the vehicle moves, and the logical segmentation segments a lane included in the road into logical lanes; allocating a road resource to the vehicle based on the road resource allocation request, where the road resource includes at least one logical lane corresponding to the at least one road segment identifier; and sending a lane identifier of the at least one logical lane to the vehicle.

14 Claims, 8 Drawing Sheets

(56) References Cited

U.S. PATENT DOCUMENTS

| | | | |
|---|---|---|---|
| 2008/0004802 A1* | 1/2008 | Horvitz | G01C 21/3415 701/533 |
| 2009/0005965 A1* | 1/2009 | Forstall | G01C 21/3484 701/533 |
| 2009/0279499 A1* | 11/2009 | Machida | H04W 72/0486 370/330 |
| 2015/0371352 A1 | 12/2015 | Boss et al. | |
| 2017/0025018 A1* | 1/2017 | Gignac | G08G 1/163 |
| 2019/0385446 A1* | 12/2019 | Lepp | G08G 1/0116 |

FOREIGN PATENT DOCUMENTS

| | | |
|---|---|---|
| CN | 101608926 B | 2/2012 |
| CN | 102951149 A | 3/2013 |
| CN | 103198658 A | 7/2013 |
| CN | 103337167 A | 10/2013 |
| CN | 103531024 A | 1/2014 |
| CN | 104200649 A | 12/2014 |
| CN | 104751628 A | 7/2015 |
| CN | 104794919 A | 7/2015 |
| CN | 104882020 A | 9/2015 |
| CN | 105128858 A | 12/2015 |
| CN | 105675000 A | 6/2016 |
| EP | 2562735 A1 | 2/2013 |
| JP | H07129886 A | 5/1995 |
| JP | 2005141724 A | 6/2005 |
| WO | 2016/086139 A1 | 6/2016 |

\* cited by examiner

LANE SCHEDULING METHOD, METHOD FOR OBTAINING LANE INFORMATION, VEHICLE, AND MANAGEMENT DEVICE

CROSS-REFERENCE TO RELATED APPLICATIONS

This application is a continuation of International Application No. PCT/CN2016/087869, filed on Jun. 30, 2016, the disclosure of which is hereby incorporated by reference in its entirety.

TECHNICAL FIELD

The present invention relates to the intelligent transportation field, and in particular, to a lane scheduling method, a method for obtaining lane information, a vehicle, and a management device.

BACKGROUND

In essence, transportation is to use a road to transport a person or an object from one place to another place. Therefore, the road is a most critical resource in a transportation system. A focus of an intelligent transportation system is to resolve safety and efficiency problems of the transportation system. Therefore, how to use the road resource safely and highly efficiently becomes a primary task of the intelligent transportation system. An objective of the intelligent transportation system is to build, by integrating and applying technologies such as advanced information, communications, sensing, control, and computer technologies, an accurate, real-time, and high-efficiency comprehensive traffic and transportation management system that plays all-round functions in a wide range. The intelligent transportation system can effectively use traffic facilities, reduce traffic load and environmental pollution, ensure traffic safety, and improve transportation efficiency. The intelligent transportation system is a future development direction of the transportation system, and is also an important component of a smart city. Development of the intelligent transportation system is inseparable from development of the Internet of Things. The intelligent transportation system is an embodiment of the traffic and transportation industry based on the Internet of Things, and includes collecting, processing, publishing, exchanging, analyzing, and using various types of information in the transportation system. As shown in FIG. 1, main participants in the intelligent transportation system include a road infrastructure, a vehicle, a user, a management center, and the like. The whole system may include a vehicle control subsystem, a traffic information subsystem, a traffic management subsystem, and the like. The vehicle control subsystem is responsible for controlling moving of the vehicle safely and highly efficiently. The traffic information subsystem is responsible for collecting, processing, and exchanging information of traffic participants accurately in time. The traffic management subsystem is responsible for performing coordination control on actions of the traffic participants based on the traffic information.

Currently the industry has some practical experience in aspects such as road planning (for example, area coverage and disposition of road intersections) and disposition of road-related infrastructures (for example, signal lights and diverging zones). However, because the road itself is relatively static and is always used coarsely, there is no sufficient exploration about refined use of the resource. With development of vehicle control technologies, from obtaining internal and external information by the vehicle for a driver for reference, to assisting, by the vehicle based on information of various aspects, a driver in controlling more functions, and further to completely automatic control of the vehicle, faster and more intelligent reactions of the vehicle in the transportation system also require that usage of the road resource by the vehicle should be controlled more accurately.

A conventional method is as follows: A management center records a road between two road intersections B and E in FIG. 2 as a natural road segment BE. Lanes obtained by dividing the natural road segment are referred to as natural lanes, and three lanes that are obtained by transversely dividing the natural road segment BE are referred to as natural lanes BE 1, BE 2, and BE 3, respectively. Vehicle monitoring instruments are disposed at the road intersection B and the road intersection of the natural lanes BE 1, BE 2, and BE 3. When a vehicle passes through the road intersection B and moves out of the road intersection E, the vehicle monitoring instrument sends vehicle move-in information or vehicle move-out information to the management center. The management center may determine a quantity of vehicles on the natural lanes BE 1, BE 2, and BE 3 based on the vehicle move-in information or the vehicle move-out information, to approximately learn usage of lane resources of the natural lanes BE 1, BE 2, and BE 3. When a quantity of vehicles on the natural lane BE 1 exceeds a threshold (to be specific, Length of the natural lane BE 1=Safe trailing distance between two adjacent vehicles*Quantity of vehicles), the management center sends prompt information, to prompt that the natural lane BE 1 is congested and prevent a subsequent vehicle from entering the natural lane BE 1, or instruct a subsequent vehicle to change from the lane to the natural lane BE 2.

However, in the conventional method, because a length range of a natural road segment on a road varies greatly. For example, a distance between two adjacent road intersections in a business district is greatly different from a distance between an entrance and an exit that are adjacent on a highway. In an actual situation, on a very long natural road segment, it is ubiquitous that a vehicle changes between lanes. For example, in FIG. 2, a vehicle 1 enters the BE 1; if there is a traffic jam on the BE 1 when the vehicle 1 reaches a midway of the BE 1, but the lane BE 2 adjacent to the BE 1 is idle, if the vehicle 1 changes from the lane to the BE 2, the management center still counts the vehicle 1 into the quantity of vehicles on the BE 1. Therefore, it is inaccurate for the management device to determine that the quantity of vehicles on the BE 1 exceeds the threshold; the sent prompt information is inaccurate; and a subsequent vehicle can still move into the BE 1. If the vehicle 1 does not change the lane, the idle BE 2 cannot be used. Regardless of whether the vehicle 1 changes the lane, efficiency of using the road resource is not high.

SUMMARY

Embodiments of the present invention provide a lane scheduling method, a method for obtaining lane information, a vehicle, and a management device, so that the management device allocates a logical lane to a vehicle based on a road resource allocation request. Therefore, when there are a lot of vehicles, the management device can allocate road resources globally to implement refined management of vehicles and improve utilization of road resources and safety of moving vehicles.

A first aspect of the present invention provides a lane scheduling method, including:

receiving, by a management device, a road resource allocation request sent by a vehicle, where the road resource allocation request includes at least one road segment identifier, the road segment identifier is used to identify a logical road segment expected to be used by the vehicle, the logical road segment is a logical segment of a road on which the vehicle moves, a lane included in the road is segmented into logical lanes, and the logical road segment includes at least one logical lane; allocating a road resource to the vehicle based on the road resource allocation request, where the road resource includes at least one logical lane corresponding to the at least one road segment identifier; and sending a lane identifier of the at least one logical lane to the vehicle.

An intelligent transportation system divides the road into at least two logical road segments in advance, where the logical road segments are indicated by road segment identifiers on a traffic map, and logical lanes in the logical road segments are indicated by lane identifiers. The intelligent transportation system sends a new traffic map formed by division to the vehicle by using a communications network. A vehicular device that can perform real-time communication with the management device is integrated or additionally installed in the vehicle. When the vehicle needs to pass through one or several continuous logical road segments, after the management device receives the road resource allocation request sent by the vehicle and including the at least one road segment identifier, the management device allocates, to the vehicle that sends the request, the road resource of the at least one logical lane corresponding to the at least one road segment identifier, and sends the lane identifier of the allocated logical lane to the vehicle. Therefore, after the vehicle obtains the lane identifier, the vehicle is instructed to pass through the logical lane corresponding to the lane identifier by automated driving, assisted driving, or manual driving. In comparison with the prior art, by dividing the road into logical road segments, the management device can allocate, to the vehicle, a logical lane in each logical road segment for moving, and can implement refined management of the vehicle on the road. Therefore, the management device can allocate road resources globally to improve utilization of road resources, and adjust density of vehicles in different lanes on the road to enhance safety of vehicles moving on the road.

In one embodiment of the present invention, the management device may feed back, by adding the lane identifier to a road resource response, the road resource response to the vehicle that sends the road resource request.

In one embodiment, the allocating, by the management device, a road resource to the vehicle based on the road resource allocation request includes:

parsing, by the management device, the road resource allocation request to obtain the road segment identifier; obtaining, based on the road segment identifier, lane status information of each logical lane in the logical road segment corresponding to the road segment identifier, where the lane status information includes an idle state, an occupied state, and a reserved state; and determining, based on the lane status information, a logical lane to be allocated to the vehicle.

After receiving the road resource allocation request, the management device parses the road resource allocation request to obtain the road segment identifier, finds the corresponding logical road segment from a traffic map based on the road segment identifier, and obtains the lane status information of each logical lane in the logical road segment, where the lane status information includes the idle state, the occupied state, and the reserved state, and a logical lane in which the vehicle moves when the vehicle passes through the logical road segment can be determined based on a current status in the lane status information. Because the road resource is allocated based on the lane status information, the vehicle can accurately avoid choosing a logical lane in which a vehicle exists from the logical road segment, but choose an idle logical lane in which no vehicle exists. This improves utilization of road resources.

In one embodiment, after the allocating, by the management device, a road resource to the vehicle based on the road resource allocation request, where the road resource includes at least one logical lane corresponding to the at least one road segment identifier, the method further includes:

setting, by the management device, the lane status information of the logical lane to the reserved state; when the vehicle moves into the logical lane, receiving a move-in notification sent by the vehicle; setting the lane status information of the logical lane to the occupied state based on the move-in notification; when the vehicle moves out of the logical lane, receiving a move-out notification sent by the vehicle; and setting the lane status information of the logical lane to the idle state based on the move-out notification.

After sending the lane identifier to the vehicle, the management device sets the lane status information of the logical lane allocated to the vehicle, to the reserved state starting from a current time; when the vehicle moves into or moves out of the logical lane, the vehicle sends the move-in notification or the move-out notification; and the management device updates the lane status information of the logical lane based on the notifications. This helps the management device master conditions of all logical lanes on the road and allocate road resources more accurately.

In one embodiment, the road resource allocation request further includes a road segment use time, and the road segment use time indicates an expected time of using the logical road segment by the vehicle; and the allocating, by the management device, a road resource to the vehicle based on the road resource allocation request includes:

obtaining, by the management device, the road segment identifier and the road segment use time based on the road resource allocation request; obtaining, based on the road segment identifier and the road segment use time, the lane status information of each logical lane in the logical road segment corresponding to the road segment identifier within the road segment use time; and determining, based on the lane status information, the logical lane to be allocated to the vehicle and a lane use time, where the lane use time indicates a time allocated by the management device to the vehicle for using the logical lane.

If the vehicle needs to pass through the logical road segment in an expected time period, the road resource allocation request further includes the road segment use time; and the road resource allocated by the management device is precise to the logical lane in the logical road segment and the lane use time of the logical lane that the vehicle passes through. The road resource allocation precise to the lane and the moving time is more helpful for performing refined management of vehicles on the road.

In one embodiment, after the allocating, by the management device, a road resource to the vehicle based on the road resource allocation request, where the road resource includes at least one logical lane corresponding to the at least one road segment identifier, the method further includes:

setting, by the management device, the lane status information of the logical lane within the lane use time to the reserved state; when the vehicle moves into the logical lane, receiving a move-in notification sent by the vehicle; setting the lane status information of the logical lane within a remaining part of the lane use time to the occupied state based on the move-in notification; when the vehicle moves out of the logical lane, receiving a move-out notification sent by the vehicle; and setting the lane status information of the logical lane within a remaining part of the lane use time to the idle state based on the move-out notification.

After sending the road resource allocation response to the vehicle, the management device sets the lane status information of the logical lane within the lane use time to the reserved state, so that the same logical lane is not allocated when another vehicle has a same request. This prevents two vehicles from moving into the same logical lane at the same time to cause an accident; when the vehicle moves into or moves out of the logical lane, the vehicle sends the move-in notification or the move-out notification; and the management device updates the lane status information of the logical lane within the remaining part of the lane use time based on the notifications. This helps the management device master conditions of the whole road in real time and allocate road resources more accurately.

In one embodiment, the lane scheduling method further includes:

when the vehicle does not move into the logical lane within the lane use time, obtaining new lane status information of the logical road segment; allocating a new road resource to the vehicle based on the new lane status information, and generating a first road resource update notification based on the new road resource, where the first road resource update notification includes an updated lane identifier and an updated lane use time, the updated lane identifier is used to identify a logical lane updated by the management device for the vehicle, and the updated lane use time indicates a time of using the updated logical lane by the vehicle; and sending the first road resource update notification to the vehicle.

When the vehicle does not move into the logical lane within the lane use time, it indicates that the vehicle may not move based on the road resource allocation response fed back by the management device. For example, the vehicle cannot move into the logical lane within the lane use time because the vehicle moves at a reduced speed before the logical lane. In this case, the new road resource needs to be reallocated to the vehicle based on the new lane status information, the first road resource update notification is generated, and the first road resource update notification is sent to the vehicle, to satisfy a requirement of the vehicle for the road resource.

In one embodiment, the lane scheduling method further includes:

when the vehicle does not move out of the logical lane within the lane use time, increasing a duration of the lane use time, and generating a second road resource update notification; and sending the second road resource update notification to the vehicle, where the second road resource update notification includes an updated lane use time, and the updated lane use time indicates an updated time of using the logical lane by the vehicle.

If the vehicle moves into the logical lane based on the road resource allocation response, but a vehicle fault occurs, causing the vehicle to stop or move at a reduced speed, the vehicle cannot move out of the logical lane within the lane use time. The management device increases the lane use time of using the logical lane by the vehicle, generates the second road resource update notification, and sends the second road resource update notification to the vehicle. This improves flexibility of the management device in the lane scheduling process.

In one embodiment, the lane scheduling method further includes:

when the reserved state of the logical lane changes before the lane use time, obtaining new lane status information of the logical road segment; allocating a new road resource to the vehicle based on the new lane status information, and generating a third road resource update notification based on the new road resource, where the third road resource update notification includes an updated lane identifier and an updated lane use time, the updated lane identifier is used to identify a logical lane updated by the management device for the vehicle, and the updated lane use time indicates a time of using the updated logical lane by the vehicle; and sending the third road resource update notification to the vehicle.

When the reserved state of the logical lane changes before the lane use time, for example, if a vehicle fault occurs in the logical lane, and vehicle maintenance personnel report a maintenance time, where the lane use time is included in the maintenance time, no vehicle can move in the logical lane within the lane use time. In this case, the reserved state of the logical lane within the lane use time is changed to the occupied state, the logical lane allocated to the vehicle and the lane use time are updated, the third road resource update notification is generated, and the third road resource update notification is sent to the vehicle, so that the vehicle can avoid using the previously allocated logical lane and change to another logical lane to pass through the logical road segment smoothly. Therefore, safety is improved.

In one embodiment, the method lane scheduling further includes synchronizing, by the management device, information of the logical road segment and the logical lane with the vehicle, where the information of the logical road segment and the logical lane includes the road segment identifier of the logical road segment, the lane identifier of the logical lane, the road segment corresponding to the logical road segment, and the lane segment corresponding to the logical lane.

If the information of the logical road segment and the logical lane changes due to road reconstruction, for example, if a lane is added or the road segment identifier and the lane identifier are renumbered, a change is caused to the traffic map of the management device. However, the vehicle needs to synchronize its traffic map with that of the management device, so that the management device can allocate a required road resource to the vehicle accurately.

In one embodiment, the lane scheduling method further includes:

adjusting, by the management device, a length of the logical road segment, where the length of the logical road segment is not less than a safe trailing distance between two adjacent vehicles; and updating the information of the logical road segment and the logical lane based on the length of the logical road segment.

The management device may adjust the length of the logical road segment based on a condition such as traffic or a road condition. Because the length of the logical road segment is adjusted flexibly, road resources are used more flexibly. In addition, if the length is closer to the safe trailing distance between two adjacent vehicles, it is more helpful for utilization of the road resources.

In one embodiment, the road segment identifier is a road segment identifier sequence arranged in time order of moving through the at least one logical road segment by the vehicle, the road segment use time is a road segment use time sequence corresponding to the road segment identifier sequence or a total time of moving through the at least one logical road segment by the vehicle, the lane identifier is a lane identifier sequence arranged in time order of moving through the at least one logical lane by the vehicle, and the lane use time is a lane use time sequence corresponding to the lane identifier sequence or a total time of moving through the at least one logical lane by the vehicle.

When there are logical road segments on the road that the vehicle needs to pass through, the vehicle may request the management device to allocate a road resource of each logical road segment separately, or may request the management device to allocate road resources of the plurality of logical road segments at a time. In this case, the road segment identifier is actually a road segment identifier sequence, where road segment identifiers in the road segment identifier sequence are arranged in time order of moving through the logical road segments by the vehicle, and the road segment use time is a road segment use time sequence corresponding to the road segment identifier sequence or a total time of moving through the logical road segments by the vehicle. Likewise, the lane identifier and the lane use time are also indicated in this way.

In one embodiment, the road segment use time includes a move-in time of moving into the logical road segment and a move-out time of moving out of the logical road segment, or a move-in time of moving into the logical road segment and a duration of moving through the logical road segment, or a move-out time of moving out of the logical road segment and a duration of moving through the logical road segment; and the lane use time includes a move-in time of moving into the logical lane and a move-out time of moving out of the logical lane, or a move-in time of moving into the logical lane and a duration of moving through the logical lane, or a move-out time of moving out of the logical lane and a duration of moving through the logical lane.

In descriptions of manners of indicating the road segment use time and the lane use time, there may be only the move-in time and the move-out time, or the move-in time and the duration of moving may be provided, or the duration of moving and the move-out time may be provided.

A second aspect of the present invention provides a method for obtaining lane information, where the method includes:

obtaining at least one logical road segment expected to be used, and generating a road resource allocation request based on the logical road segment, where the road resource allocation request includes at least one road segment identifier, the road segment identifier is used to identify a logical road segment expected to be used by the vehicle, the logical road segment is a logical segment of a road on which the vehicle moves, the logical segmentation segments a lane included in the road into logical lanes, and the logical road segment includes at least one logical lane; sending a road resource allocation request to a management device; and receiving at least one lane identifier sent by the management device, where the lane identifier is used to identify a logical lane allocated by the management device to the vehicle for use, and the logical lane belongs to the logical road segment.

An intelligent transportation system divides the road into at least two logical road segments in advance, where the logical road segments are indicated by road segment identifiers on a traffic map, and logical lanes in the logical road segments are indicated by lane identifiers. The intelligent transportation system sends a new traffic map formed by division to the vehicle by using a communications network. A vehicular device that can perform real-time communication with the management device is integrated or additionally installed in the vehicle. When the vehicle needs to pass through a road segment, the vehicle generates the road resource allocation request, sends the request to the management device, and receives the at least one lane identifier that is fed back. Therefore, the vehicle can pass through the logical lane corresponding to the lane identifier by automated driving, assisted driving, or manual driving based on the lane identifier. In comparison with the prior art, by dividing the road into logical road segments, the management device can allocate, to the vehicle, a logical lane in each logical road segment for moving, and can implement refined management of the vehicle on the road. Therefore, the management device can allocate road resources globally to improve utilization of road resources, and adjust density of vehicles in different lanes on the road to enhance safety of vehicles moving on the road.

In one embodiment, the method for obtaining lane information further includes:

when the vehicle moves into the logical lane, sending a move-in notification to the management device; and when the vehicle moves out of the logical lane, sending a move-out notification to the management device.

When the vehicle moves into or moves out of the logical lane, the vehicle sends the move-in notification or the move-out notification, so that the management device can update the lane status information of the logical lane in time based on the notifications. This helps the management device master conditions of the whole road in real time and allocate road resources more accurately.

In one embodiment, the road resource allocation request further includes a road segment use time, and the road segment use time indicates an expected time of using the logical road segment by the vehicle; and the method for obtaining lane information further includes:

receiving a lane use time sent by the management device, where the lane use time indicates a time allocated by the management device to the vehicle for using the logical lane.

If the vehicle needs to pass through the logical road segment in an expected time period, when feeding back the lane identifier, the management device further feeds back the lane use time of the logical lane corresponding to the lane identifier; and a road resource allocated by the management device is precise to the logical lane in the logical road segment and the lane use time of the logical lane that the vehicle passes through. The road resource allocation precise to the lane and the moving time is more helpful for performing refined management of vehicles on the road.

In one embodiment, the method for obtaining lane information further includes:

receiving a first road resource update notification sent by the management device, where the first road resource update notification includes an updated lane identifier and an updated lane use time, the updated lane identifier is used to identify a logical lane updated by the management device for the vehicle, and the updated lane use time indicates a time updated by the management device for the vehicle to use the updated logical lane; or receiving a second road resource update notification sent by the management device, where the second road resource update notification includes an updated lane use time, and the updated lane use time indicates an updated time of using the logical lane by the vehicle; or receiving a third road resource update notification sent by the management device, where the third road resource update notification includes an updated lane identifier and an updated lane use time, the updated lane identifier is used to identify a logical lane updated by the management device for the vehicle, and the updated lane use time indicates a time updated by the management device for the vehicle to use the updated logical lane.

If the vehicle is abnormal and does not move based on an allocation response of the management device, the management device reallocates a new road resource to the vehicle, and the vehicle can receive the road resource update notification sent by the management device. Therefore, a requirement of the vehicle for the road resource is satisfied.

In one embodiment, synchronizing information of the logical road segment and the logical lane with the management device, where the information of the logical road segment and the logical lane includes the road segment identifier of the logical road segment, the lane identifier of the logical lane, the road segment corresponding to the logical road segment, and the lane segment corresponding to the logical lane.

If the information of the logical road segment and the logical lane changes due to road reconstruction, for example, if a lane is added or the road segment identifier and the lane identifier are renumbered, a change is caused to a traffic map of the management device. However, the vehicle needs to synchronize its traffic map with that of the management device, so that the management device can allocate a required road resource to the vehicle accurately.

In one embodiment, the road segment identifier is a road segment identifier sequence arranged in time order of moving through the at least one logical road segment by the vehicle, the road segment use time is a road segment use time sequence corresponding to the road segment identifier sequence or a total time of moving through the at least one logical road segment by the vehicle, the lane identifier is a lane identifier sequence arranged in time order of moving through the at least one logical lane by the vehicle, and the lane use time is a lane use time sequence corresponding to the lane identifier sequence or a total time of moving through the at least one logical lane by the vehicle.

When there are logical road segments on the road that the vehicle needs to pass through, the vehicle may request the management device to allocate a road resource of each logical road segment separately, or may request the management device to allocate road resources of the plurality of logical road segments at a time. In this case, the road segment identifier is actually a road segment identifier sequence, where road segment identifiers in the road segment identifier sequence are arranged in time order of moving through the logical road segments by the vehicle, and the road segment use time is a road segment use time sequence corresponding to the road segment identifier sequence or a total time of moving through the logical road segments by the vehicle. Likewise, the lane identifier and the lane use time are also indicated in this way.

In one embodiment, the road segment use time includes a move-in time of moving into the logical road segment and a move-out time of moving out of the logical road segment, or a move-in time of moving into the logical road segment and a duration of moving through the logical road segment, or a move-out time of moving out of the logical road segment and a duration of moving through the logical road segment; and the lane use time includes a move-in time of moving into the logical lane and a move-out time of moving out of the logical lane, or a move-in time of moving into the logical lane and a duration of moving through the logical lane, or a move-out time of moving out of the logical lane and a duration of moving through the logical lane.

In descriptions of manners of indicating the road segment use time and the lane use time, there may be only the move-in time and the move-out time, or the move-in time and the duration of moving may be provided, or the duration of moving and the move-out time may be provided.

A third aspect of the present invention provides a management device, including:

a device receiving module, configured to receive a road resource allocation request sent by a vehicle, where the road resource allocation request includes at least one road segment identifier, the road segment identifier is used to identify a logical road segment expected to be used by the vehicle, the logical road segment is a logical segment of a road on which the vehicle moves, the logical segmentation segments a lane included in the road into logical lanes, and the logical road segment includes at least one logical lane;

a device processing module, configured to allocate a road resource to the vehicle based on the road resource allocation request, where the road resource includes at least one logical lane corresponding to the at least one road segment identifier; and a device sending module, configured to send a lane identifier of the at least one logical lane to the vehicle.

When the vehicle needs to pass through one or several continuous logical road segments, after the device receiving module receives the road resource allocation request sent by the vehicle, the device processing module allocates the road resource to the vehicle that sends the request, and the device sending module sends the allocated road resource to the vehicle based on the allocated road resource, that is, the lane identifier of the at least one logical lane. Therefore, the vehicle can be instructed to pass through the logical lane corresponding to the lane identifier by automated driving, assisted driving, or manual driving based on the lane identifier. In comparison with the prior art, by dividing the road into logical road segments, the management device can allocate, to the vehicle, a logical lane in each logical road segment for moving, and can implement refined management of the vehicle on the road. Therefore, the management device can allocate road resources globally to improve utilization of road resources, and adjust density of vehicles in different lanes on the road to enhance safety of vehicles moving on the road.

In one embodiment, the device processing module is configured to parse the road resource allocation request to obtain the road segment identifier;

the device processing module is further configured to obtain, based on the road segment identifier, lane status information of each logical lane in the logical road segment corresponding to the road segment identifier, where the lane status information includes an idle state, an occupied state, and a reserved state; and the device processing module is further configured to determine, based on the lane status information, a logical lane to be allocated to the vehicle.

After the device receiving module receives the road resource allocation request, the device processing module parses the road resource allocation request to obtain the road segment identifier, finds the corresponding logical road segment from a traffic map based on the road segment identifier, and obtains the lane status information of each logical lane in the logical road segment, where the lane status information includes the idle state, the occupied state, and the reserved state; and the device processing module may determine, based on a current status in the lane status information, a logical lane in which the vehicle moves when the vehicle passes through the logical road segment. Because the road resource is allocated based on the lane status information, the vehicle can accurately avoid choosing a logical lane in which a vehicle exists from the logical road segment, but choose an idle logical lane in which no vehicle exists. This improves utilization of road resources.

In one embodiment, the device processing module is further configured to set the lane status information of the logical lane to the reserved state;

the device receiving module is further configured to receive, when the vehicle moves into the logical lane, a move-in notification sent by the vehicle;

the device processing module is further configured to set the lane status information of the logical lane to the occupied state based on the move-in notification;

the device receiving module is further configured to receive, when the vehicle moves out of the logical lane, a move-out notification sent by the vehicle; and the device processing module is further configured to set the lane status information of the logical lane to the idle state based on the move-out notification.

After the device sending module sends a road resource allocation response to the vehicle, the device processing module sets the lane status information of the logical lane to the reserved state; when the vehicle moves into or moves out of the logical lane, the vehicle sends the move-in notification or the move-out notification; and the device processing module updates the lane status information of the logical lane based on the notifications received by the device receiving module. This helps the management device master conditions of all logical lanes on the road and allocate road resources more accurately.

In one embodiment, the road resource allocation request further includes a road segment use time, and the road segment use time indicates an expected time of using the logical road segment by the vehicle;

the device processing module is specifically configured to obtain the road segment identifier and the road segment use time based on the road resource allocation request;

the device processing module is further configured to obtain, based on the road segment identifier and the road segment use time, the lane status information of each logical lane in the logical road segment corresponding to the road segment identifier within the road segment use time; and the device processing module is further configured to determine, based on the lane status information, the logical lane to be allocated to the vehicle and a lane use time, where the lane use time indicates a time allocated by the management device to the vehicle for using the logical lane.

If the vehicle needs to pass through the logical road segment in an expected time period, the road resource allocation request further includes the road segment use time; and the road resource allocated by the device processing module is precise to the logical lane in the logical road segment and the lane use time of the logical lane that the vehicle passes through. The road resource allocation precise to the lane and the moving time is more helpful for performing refined management of vehicles on the road.

In one embodiment, the device processing module is further configured to set the lane status information of the logical lane within the lane use time to the reserved state;

the device receiving module is further configured to receive, when the vehicle moves into the logical lane, a move-in notification sent by the vehicle;

the device processing module is further configured to set the lane status information of the logical lane within a remaining part of the lane use time to the occupied state based on the move-in notification;

the device receiving module is further configured to receive, when the vehicle moves out of the logical lane, a move-out notification sent by the vehicle; and the device processing module is further configured to set the lane status information of the logical lane within a remaining part of the lane use time to the idle state based on the move-out notification.

After the device sending module sends the lane identifier and the lane use time to the vehicle, the device processing module sets the lane status information of the logical lane within the lane use time to the reserved state, so that the device processing module does not allocate the same logical lane when another vehicle has a same request. This prevents two vehicles from moving into the same logical lane at the same time to cause an accident. When the vehicle moves into or moves out of the logical lane, the vehicle sends the move-in notification or the move-out notification, and the device processing module updates the lane status information based on the notifications received by the device receiving module. This helps the management device master conditions of the whole road in real time and allocate road resources more accurately.

In one embodiment, the device processing module is further configured to obtain new lane status information of the logical road segment when the vehicle does not move into the logical lane within the lane use time;

the device processing module is further configured to allocate a new road resource to the vehicle based on the new lane status information, and generate a first road resource update notification based on the new road resource, where the first road resource update notification includes an updated lane identifier and an updated lane use time, the updated lane identifier is used to identify a logical lane updated by the management device for the vehicle, and the updated lane use time indicates a time of using the updated logical lane by the vehicle; and the device sending module is further configured to send the first road resource update notification to the vehicle.

When the vehicle does not move into the logical lane within the lane use time, it indicates that the vehicle may not move based on the road resource allocation response fed back by the management device. For example, the vehicle cannot move into the logical lane within the lane use time because the vehicle moves at a reduced speed before the logical lane. In this case, the device processing module needs to reallocate the new road resource to the vehicle based on the new lane status information, and generate the first road resource update notification; and the device sending module sends the first road resource update notification to the vehicle, to satisfy a requirement of the vehicle for the road resource.

In one embodiment, the device processing module is further configured to: when the vehicle does not move out of the logical lane within the lane use time, increase a duration of the lane use time, and generate a second road resource update notification; and the device sending module is further configured to send the second road resource update notification to the vehicle, where the second road resource update notification includes an updated lane use time, and the updated lane use time indicates an updated time of using the logical lane by the vehicle.

If the vehicle moves into the logical lane based on a move-in time in the lane use time, but a vehicle fault occurs, causing the vehicle to stop or move at a reduced speed, the vehicle cannot move out of the logical lane within the lane use time. The device processing module increases the lane use time of using the logical lane by the vehicle, and generates the second road resource update notification; and the device sending module sends the second road resource update notification to the vehicle. This improves flexibility of the management device in the lane scheduling process.

In one embodiment, the device processing module is further configured to obtain new lane status information of the logical road segment when the reserved state of the logical lane changes before the lane use time;

the device processing module is further configured to allocate a new road resource to the vehicle based on the new lane status information, and generate a third road resource update notification based on the new road resource, where the third road resource update notification includes an updated lane identifier and an updated lane use time, the updated lane identifier is used to identify a logical lane updated by the management device for the vehicle, and the updated lane use time indicates a time of using the updated logical lane by the vehicle; and the device sending module is further configured to send the third road resource update notification to the vehicle.

When the reserved state of the logical lane changes before the lane use time, for example, if a vehicle fault occurs in the logical lane, and vehicle maintenance personnel report a maintenance time, where the lane use time is included in the maintenance time, no vehicle can move in the logical lane within the lane use time. In this case, the device processing module sets the reserved state of the logical lane within the lane use time to the occupied state; the device processing module updates the logical lane allocated to the vehicle and the lane use time, and generates the third road resource update notification; and the device sending module sends the third road resource update notification to the vehicle, so that the vehicle can avoid using the previously allocated logical lane and change to another logical lane to pass through the logical road segment smoothly. Therefore, safety is improved.

In one embodiment, the management device further includes a device synchronization module, where the device synchronization module is configured to synchronize information of the logical road segment and the logical lane with the vehicle, where the information of the logical road segment and the logical lane includes the road segment identifier of the logical road segment, the lane identifier of the logical lane, the road segment corresponding to the logical road segment, and the lane segment corresponding to the logical lane.

If the information of the logical road segment and the logical lane changes due to road reconstruction, for example, if a lane is added or the road segment identifier and the lane identifier are renumbered, a change is caused to a traffic map of the management device. However, the vehicle needs to synchronize its traffic map with that of the management device, so that the management device can allocate a required road resource to the vehicle accurately.

In one embodiment, the management device further includes an adjustment module, where the adjustment module is configured to adjust a length of the logical road segment, where the length of the logical road segment is not less than a safe trailing distance between two adjacent vehicles; and the device processing module is further configured to update the information of the logical road segment and the logical lane based on the length of the logical road segment.

The adjustment module may adjust the length of the logical road segment based on a condition such as traffic or a road condition. Because the length of the logical road segment is adjusted flexibly, road resources are used more flexibly. In addition, if the length is closer to the safe trailing distance between two adjacent vehicles, it is more helpful for utilization of the road resources.

A fourth aspect of the present invention provides a vehicle, including:

a vehicle processing module, configured to obtain at least one logical road segment expected to be used, and generate a road resource allocation request based on the logical road segment, where the road resource allocation request includes at least one road segment identifier, the road segment identifier is used to identify a logical road segment expected to be used by the vehicle, the logical road segment is a logical segment of a road on which the vehicle moves, the logical segmentation segments a lane included in the road into logical lanes, and the logical road segment includes at least one logical lane;

a vehicle sending module, configured to send the road resource allocation request to a management device; and a vehicle receiving module, configured to receive at least one lane identifier sent by the management device, where the lane identifier is used to identify a logical lane allocated by the management device to the vehicle for use, and the logical lane belongs to the logical road segment.

When the vehicle needs to pass through a road segment, the vehicle processing module generates the road resource allocation request; the vehicle sending module sends the request to the management device; and the vehicle receiving module receives the at least one lane identifier that is fed back. Therefore, the vehicle can pass through the logical lane corresponding to the lane identifier by automated driving, assisted driving, or manual driving based on the lane identifier. In comparison with the prior art, by dividing the road into logical road segments, the management device can allocate, to the vehicle, a logical lane in each logical road segment for moving, and can implement refined management of the vehicle on the road. Therefore, the management device can allocate road resources globally to improve utilization of road resources, and adjust density of vehicles in different lanes on the road to enhance safety of vehicles moving on the road.

In one embodiment, the vehicle sending module is further configured to send a move-in notification to the management device when the vehicle moves into the logical lane; and the vehicle sending module is further configured to send a move-out notification to the management device when the vehicle moves out of the logical lane.

When the vehicle moves into or moves out of the logical lane, the vehicle sending module sends the move-in notification or the move-out notification, so that the management device can update lane status information of the logical lane in time based on the notifications. This helps the management device master conditions of the whole road in real time and allocate road resources more accurately.

In one embodiment, the road resource allocation request further includes a road segment use time, and the road segment use time indicates an expected time of using the logical road segment by the vehicle; and the vehicle receiving module is further configured to receive a lane use time sent by the management device, where the lane use time indicates a time allocated by the management device to the vehicle for using the logical lane.

If the vehicle needs to pass through the logical road segment in an expected time period, when feeding back the lane identifier, the management device further feeds back the lane use time of the logical lane corresponding to the lane identifier; and a road resource allocated by the management device is precise to the logical lane in the logical road segment and the lane use time of the logical lane that the vehicle passes through. The road resource allocation precise to the lane and the moving time is more helpful for performing refined management of vehicles on the road.

In one embodiment, the vehicle receiving module is further configured to receive a first road resource update notification sent by the management device, where the first road resource update notification includes an updated lane identifier and an updated lane use time, the updated lane identifier is used to identify a logical lane updated by the management device for the vehicle, and the updated lane use time indicates a time updated by the management device for the vehicle to use the updated logical lane;

the vehicle receiving module is further configured to receive a second road resource update notification sent by the management device, where the second road resource update notification includes an updated lane use time, and the updated lane use time indicates an updated time of using the logical lane by the vehicle; or the vehicle receiving module is further configured to receive a third road resource update notification sent by the management device, where the third road resource update notification includes an updated lane identifier and an updated lane use time, the updated lane identifier is used to identify a logical lane updated by the management device for the vehicle, and the updated lane use time indicates a time updated by the management device for the vehicle to use the updated logical lane.

In this embodiment of the present invention, if the vehicle is abnormal and does not move based on an allocation response of the management device, the management device reallocates a new road resource to the vehicle, and the vehicle receiving module can receive the road resource update notification sent by the management device, so that the vehicle can pass through the logical road segment based on the road resource update notification. Therefore, a requirement of the vehicle for the road resource is satisfied.

In one embodiment, the vehicle further includes a vehicle synchronization module, where the vehicle synchronization module is configured to synchronize information of the logical road segment and the logical lane with the management device, where the information of the logical road segment and the logical lane includes the road segment identifier of the logical road segment, the lane identifier of the logical lane, the road segment corresponding to the logical road segment, and the lane segment corresponding to the logical lane.

If the information of the logical road segment and the logical lane changes due to road reconstruction, for example, if a lane is added or the road segment identifier and the lane identifier are renumbered, a change is caused to a traffic map of the management device. However, the vehicle needs to synchronize its traffic map with that of the management device, so that the management device can allocate a required road resource to the vehicle accurately.

A fifth aspect of the present invention provides a management device, including:

a wireless network interface, a central processing unit CPU, and a memory, where the wireless network interface, the CPU, and the memory are interconnected by a bus, the memory stores a computer instruction, and the CPU implements the following method by executing the computer instruction:

receiving, by the wireless network interface, a road resource allocation request sent by a vehicle, where the road resource allocation request includes at least one road segment identifier, the road segment identifier is used to identify a logical road segment expected to be used by the vehicle, the logical road segment is a logical segment of a road on which the vehicle moves, the logical segmentation segments a lane included in the road into logical lanes, and the logical road segment includes at least one logical lane;

allocating, by the CPU, a road resource to the vehicle based on the road resource allocation request, where the road resource includes at least one logical lane corresponding to the at least one road segment identifier; and sending, by the wireless network interface, a lane identifier of the at least one logical lane to the vehicle.

When the vehicle needs to pass through one or several continuous logical road segments, after the wireless network interface receives the road resource allocation request sent by the vehicle, the CPU allocates the road resource to the vehicle that sends the request, and the wireless network interface sends the lane identifier to the vehicle based on the allocated road resource. Therefore, after obtaining the lane identifier, the vehicle can be instructed to pass through the logical lane corresponding to the lane identifier by automated driving, assisted driving, or manual driving based on the lane identifier. In comparison with the prior art, by dividing the road into logical road segments, the management device can allocate, to the vehicle, a logical lane in each logical road segment for moving, and can implement refined management of the vehicle on the road. Therefore, the management device can allocate road resources globally to improve utilization of road resources, and adjust density of vehicles in different lanes on the road to enhance safety of vehicles moving on the road.

BRIEF DESCRIPTION OF DRAWINGS

To describe the technical solutions in the embodiments of the present invention more clearly, the following briefly describes the accompanying drawings required for describing the embodiments and the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a lane scheduling method, a method for obtaining lane information, a vehicle, and a management device, so that the management device allocates a logical lane to a vehicle based on a road resource allocation request. Therefore, when there are a lot of vehicles, the management device can allocate road resources globally to implement refined management of vehicles and improve utilization of road resources and safety of moving vehicles.

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

First, a system architecture or a scenario to which the present invention is applied is described briefly.

Figure 1:
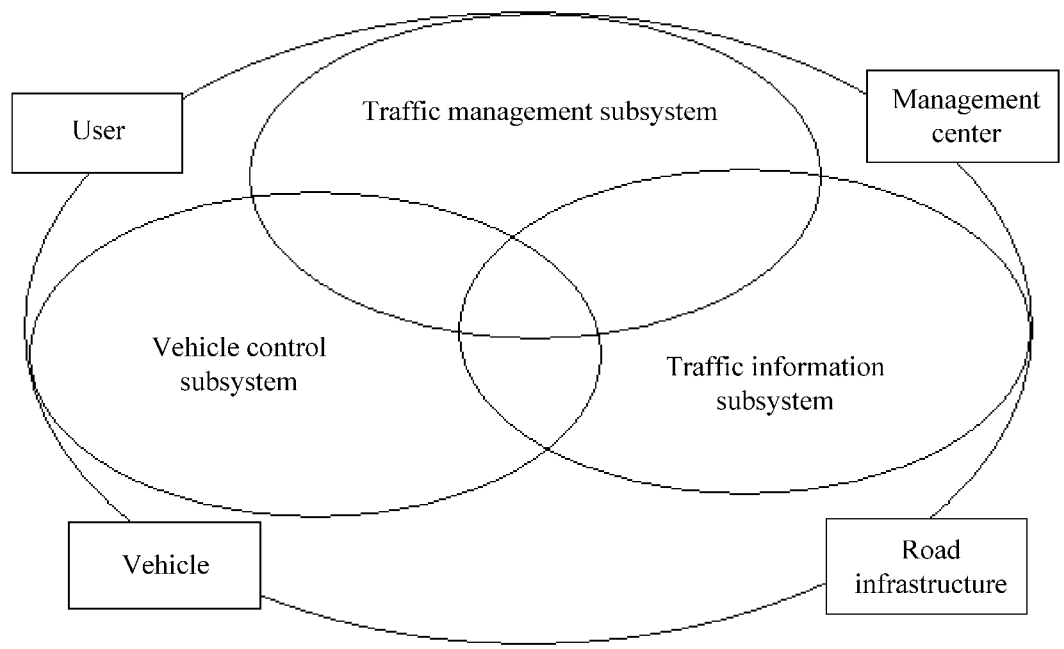
FIG. 1 is a schematic diagram of an intelligent transportation system according to the present invention.

A lane scheduling method in the present invention is applied to an intelligent transportation system shown in FIG. 1. Main participants in the intelligent transportation system include a road infrastructure, a vehicle, a user, a management center, and the like. The whole system may include a vehicle control subsystem, a traffic information subsystem, a traffic management subsystem, and the like. The vehicle control subsystem is responsible for controlling moving of the vehicle safely and highly efficiently. The traffic information subsystem is responsible for collecting, processing, and exchanging information of traffic participants accurately in time. The traffic management subsystem is responsible for performing coordination control on actions of the traffic participants based on the traffic information. The management center mainly includes a management device, and the management device has functions such as road resource allocation. A device that can perform real-time communication with the management device is integrated or installed in the vehicle, so that the vehicle can assist the user in driving, or can implement an automated driving function. The vehicle further includes a device having a positioning function. The road infrastructure includes devices such as signal lights and roadside speedometers.

Figure 11:
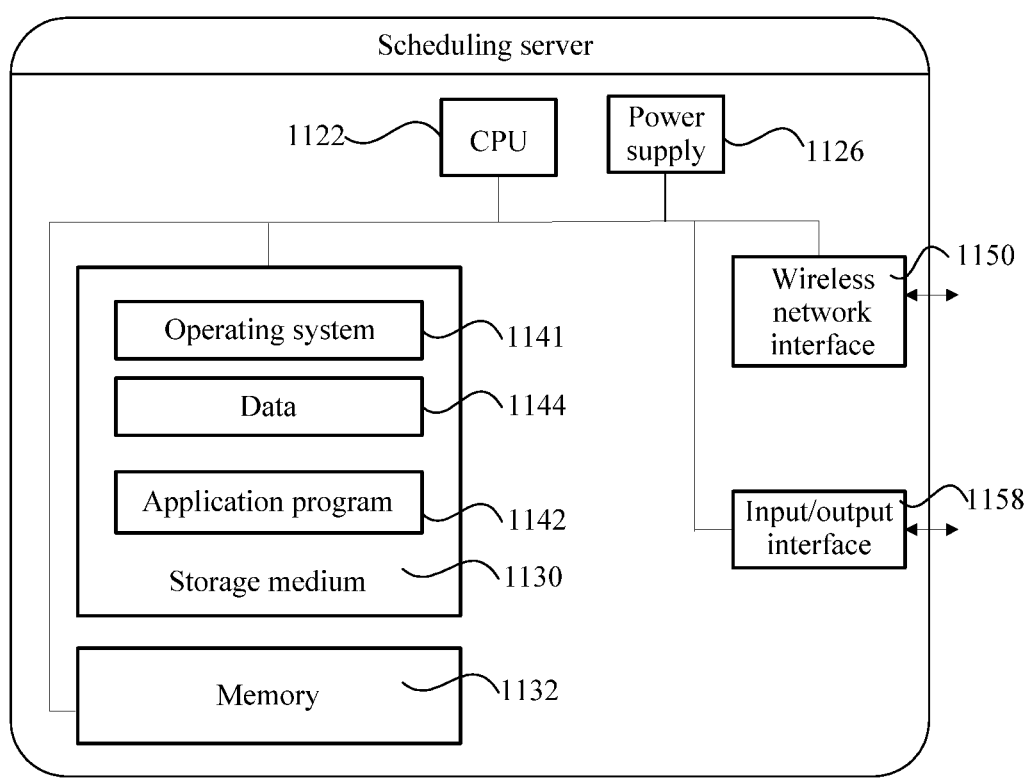
FIG. 11 is a schematic structural diagram of a physical apparatus of a management device according to the present invention.

For example, the management device is a server. FIG. 11 is a schematic structural diagram of a server according to the present invention. The server may vary greatly due to different configurations or performance, and may include one or more central processing units (central processing units, CPUs) 1122 (for example, one or more processors), a memory 1132, and one or more storage media 1130 (for example, one or more mass storage devices) storing an application program 1142 or data 1144. The memory 1132 and the storage medium 1130 may be a transitory storage or a persistent storage. The program stored in the storage medium 1130 may include one or more modules (not shown in the figure), and each module may include instructions for performing a series of operations on the server. Further, the CPU 1122 may be configured to communicate with the storage medium 1130, and perform a series of operations on the server based on the instructions in the storage medium 1130.

The server may further include one or more power supplies 1129, one or more wireless network interfaces 1150, one or more input/output interfaces 1158, and/or one or more operating systems 1141, for example, Windows Server, Mac OS X, Unix, Linux, and FreeBSD.

Figure 2:
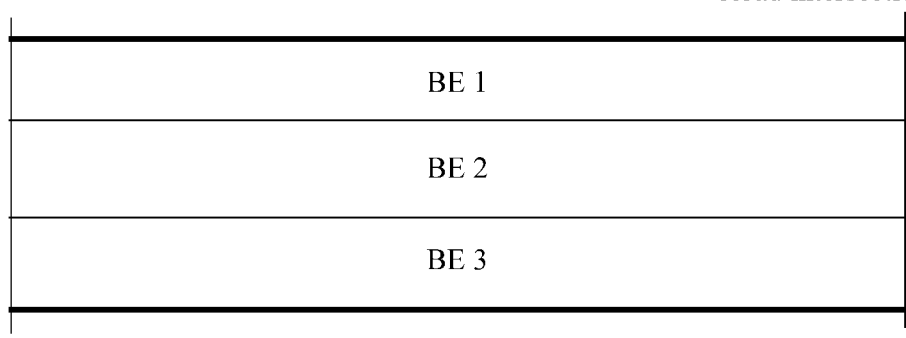
FIG. 2 is a schematic diagram of a natural road segment BE according to the present invention.
Figure 3:
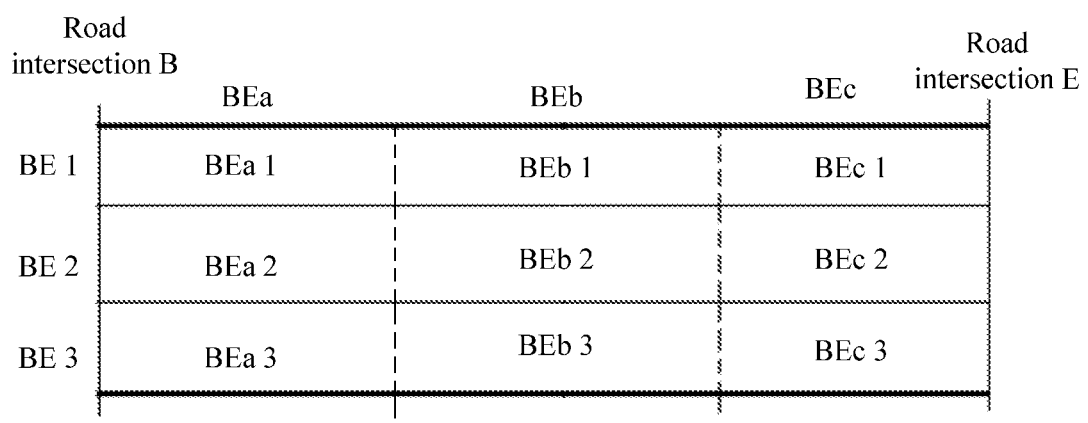
FIG. 3 is a schematic diagram of a natural road segment BE divided into logical road segments according to the present invention.

The management device and the vehicle have consistent traffic maps. The intelligent transportation system divides a natural road segment (to be specific, a road constructed in a segmentation range) including at least one natural lane, into at least two logical road segments in advance. In one embodiment, a length set for a logical road segment is not less than a safe trailing distance between two adjacent vehicles. In addition, considering a more refined scheduling requirement of the intelligent transportation system, the length of the logical road segment should be set to be as close as possible to the safe trailing distance between two adjacent vehicles. The safe trailing distance between two adjacent vehicles is determined based on road conditions. On the traffic map, the natural road segment, the logical road segments, and logical lanes of the logical road segments are indicated by identifiers, and a formed new traffic map is sent to the vehicle by using a communications network. On a natural road segment BE (with a length of 300 m) shown in FIG. 2, a vehicle speed is limited in a range of 60 km/h (about 17 m/s) to 120 km/h (about 33 m/s). As shown in FIG. 3, the natural road segment BE is divided into three logical road segments: a BEa (including logical lanes BEa 1, BEa 2, and BEa 3), a BEb (including logical lanes BEb 1, BEb 2, and BEb 3), and a BEc (including logical lanes BEc 1, BEc 2, and BEc 3), where a length of the logical road segment BEa is 100 m, a length of the logical road segment BEb is 100 m, and a length of the logical road segment BEc is 100 m. Depending on the vehicle speed limit and weather conditions, a safe trailing distance between two adjacent vehicles on the BE is in a range of 50 m to 100 m, and division of the logical road segments meets a requirement. It may be understood that the BE 1, the BE 2, and the BE 3 are all co-directional lanes.

With reference to an embodiment of interaction between the management device and the vehicle, the following describes a lane scheduling method applied to the foregoing system architecture or scenario. In this embodiment, a vehicle is represented by a vehicle-side device that is applied to the lane scheduling method and may be integrated in the vehicle or installed in the vehicle later.

Figure 4:
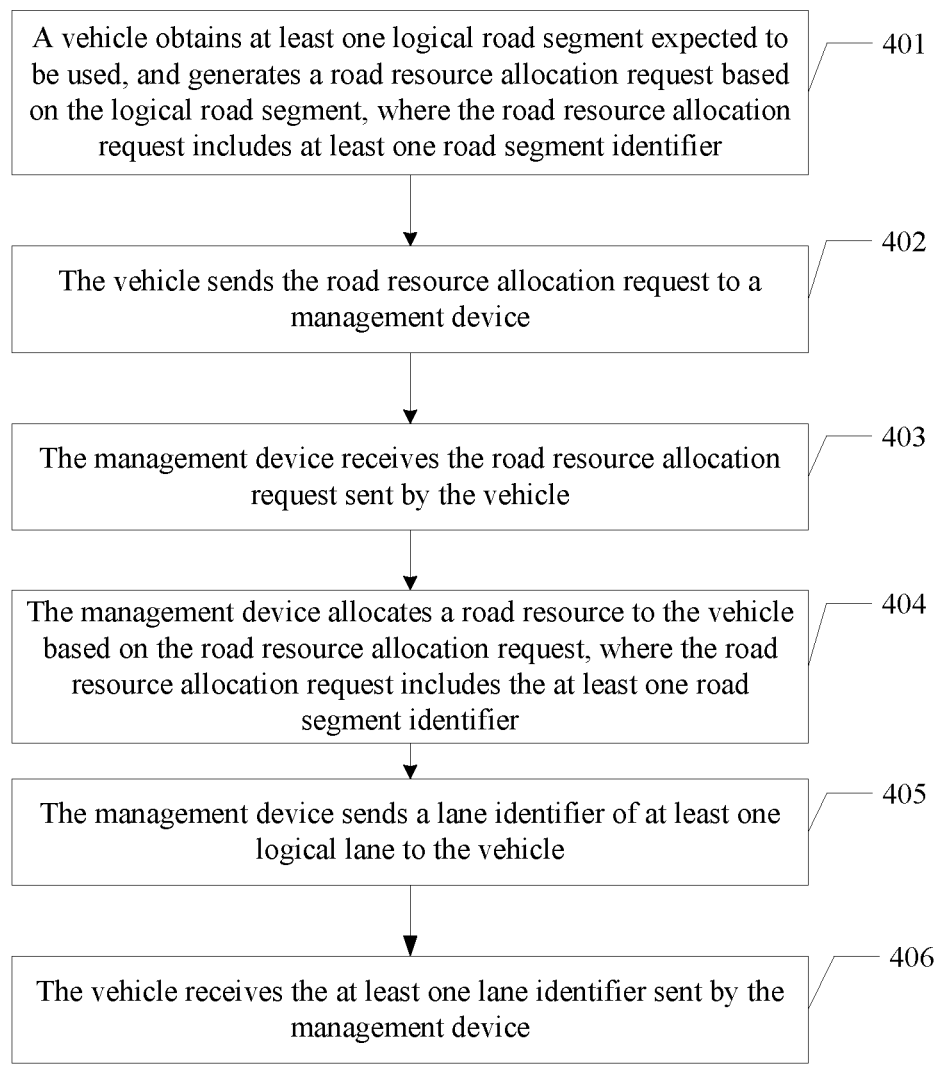
FIG. 4 is a schematic flowchart of a lane allocation method according to the present invention.

Referring to FIG. 4, an embodiment of the present invention provides a lane scheduling method, including the following operations.

Operation 401. A vehicle obtains at least one logical road segment expected to be used, and generates a road resource allocation request based on the logical road segment, where the road resource allocation request includes at least one road segment identifier.

In this embodiment, when the vehicle needs to pass through one or more logical road segments of a road on which the vehicle moves, the vehicle obtains at least one logical road segment expected to be used, and generates a road resource allocation request based on the logical road segment, where the road resource allocation request includes at least one road segment identifier, the road segment identifier is used to identify the logical road segment expected to be used by the vehicle, the logical road segment is a logical segment of the road on which the vehicle moves, the logical segmentation segments a lane included in the road into logical lanes, and the logical road segment includes at least one logical lane. Assuming that the vehicle needs to pass through a logical road segment BEa, the road resource allocation request includes a road segment identifier BEa.

Operation 402. The vehicle sends the road resource allocation request to a management device.

In this embodiment, because a real-time communications connection is established between the vehicle and the management device, after the road resource allocation request is generated, the road resource allocation request is sent to the management device.

Operation 403. The management device receives the road resource allocation request sent by the vehicle.

In this embodiment, the management device receives the road resource allocation request sent by the vehicle, and the management device knows an identifier of the vehicle during communication with the vehicle, so that when a response is fed back, the response can be sent to the corresponding vehicle accurately. It should be noted that recognizing a vehicle based on a vehicle identifier is merely an existing implementation. In an actual application, other manners may also exist, and are not limited herein.

Operation 404. The management device allocates a road resource to the vehicle based on the road resource allocation request, where the road resource allocation request includes the at least one road segment identifier.

In this embodiment, after receiving the road resource allocation request sent by the vehicle, the management device allocates the road resource based on the road resource allocation request, where the road resource includes at least one logical lane corresponding to the at least one road segment identifier. For example, a logical lane BEa 1 is selected from logical lanes BEa 1, BEa 2, and BEa 3 of the logical road segment BEa, and the logical lane BEa 1 is a logical lane allocated by the management device to the vehicle for use when the vehicle passes through the logical road segment BEa.

Operation 405. The management device sends a lane identifier of at least one logical lane to the vehicle.

In this embodiment, the management device sends, to the vehicle, the lane identifier of the at least one logical lane allocated to the vehicle, for example, sends the lane identifier (BEa 1) of the logical lane BEa 1 to the vehicle.

Operation 406. The vehicle receives the at least one lane identifier sent by the management device.

In this embodiment, the vehicle receives the at least one lane identifier sent by the management device, and may display the lane identifier on a navigation device of the vehicle to a user based on settings of the vehicle, or plays the lane identifier in a voice mode when a user drives the vehicle, or the vehicle passes through the logical road segment corresponding to the lane identifier by assisted driving or automated driving based on the lane identifier. Specific manners are not limited.

In this embodiment of the present invention, the management device allocates the logical lane to the vehicle based on the road resource allocation request sent by the vehicle, and sends, to the vehicle, the lane identifier corresponding to the logical lane. Therefore, the vehicle can pass through the logical lane corresponding to the lane identifier by automated driving, assisted driving, or manual driving based on the lane identifier of the logical lane. In comparison with the prior art, by dividing the road into logical road segments, the management device can allocate, to the vehicle, a logical lane in each logical road segment for moving, and can implement refined management of the vehicle on the road. Therefore, the management device can allocate road resources globally to improve utilization of road resources, and adjust density of vehicles in different lanes on the road to enhance safety of vehicles moving on the road.

It should be noted that, in an example of a solution of the present invention, the management device may feed back, by adding the lane identifier to a road resource response, the road resource response to a vehicle that sends a road resource request. In an actual implementation, another manner may be used, and is not specifically limited.

Optionally, in some embodiments of the present invention, that the management device allocates a road resource to the vehicle based on the road resource allocation request includes:

the management device parses the road resource allocation request to obtain the road segment identifier;

the management device obtains, based on the road segment identifier, lane status information of each logical lane in the logical road segment corresponding to the road segment identifier, where the lane status information includes an idle state, an occupied state, and a reserved state; and the management device determines, based on the lane status information, a logical lane to be allocated to the vehicle.

In this embodiment of the present invention, after receiving the road resource allocation request, the management device parses the road resource allocation request to obtain the road segment identifier, finds the corresponding logical road segment from a traffic map based on the road segment identifier, and obtains the lane status information of each logical lane in the logical road segment, where the lane status information includes the idle state, the occupied state, the reserved state, and the like, the idle state indicates that no vehicle moves in a current lane, the occupied state indicates that a vehicle moves in the current lane, the reserved state indicates that the lane is already allocated to another vehicle for moving, and a logical lane in which the vehicle moves when the vehicle passes through the logical road segment can be determined based on a current status in the lane status information. Because the road resource is allocated based on the lane status information, the vehicle can accurately avoid choosing a logical lane in which a vehicle exists from the logical road segment, but choose an idle logical lane in which no vehicle exists. This improves utilization of road resources.

Optionally, in some embodiments of the present invention, after the management device allocates the road resource to the vehicle based on the road resource allocation request, the method further includes:

the management device sets the lane status information of the logical lane to the reserved state;

when the vehicle moves into the logical lane, the vehicle sends a move-in notification to the management device;

the management device sets the lane status information of the logical lane to the occupied state based on the move-in notification;

when the vehicle moves out of the logical lane, the vehicle sends a move-out notification to the management device; and the management device sets the lane status information of the logical lane to the idle state based on the move-out notification.

In this embodiment of the present invention, after sending a road resource allocation response to the vehicle, the management device sets the lane status information of the logical lane allocated to the vehicle, to the reserved state. Herein it may be understood that starting from an allocation time, the reserved state of the logical lane does not change until reception of the move-in notification sent by the vehicle; when the vehicle receives the road resource allocation response and moves into or moves out of the logical lane, the vehicle sends the move-in notification or the move-out notification; and the management device updates the lane status information of the logical lane based on the notifications. This helps the management device master conditions of all logical lanes on the road and allocate road resources more accurately.

In the foregoing embodiment, no road resource use time is set for the road resource, and this is not helpful for refined management of vehicles on the road. The following describes a case in which a road resource allocation request further includes a road segment use time and a road resource further includes a lane use time.

Figure 5:
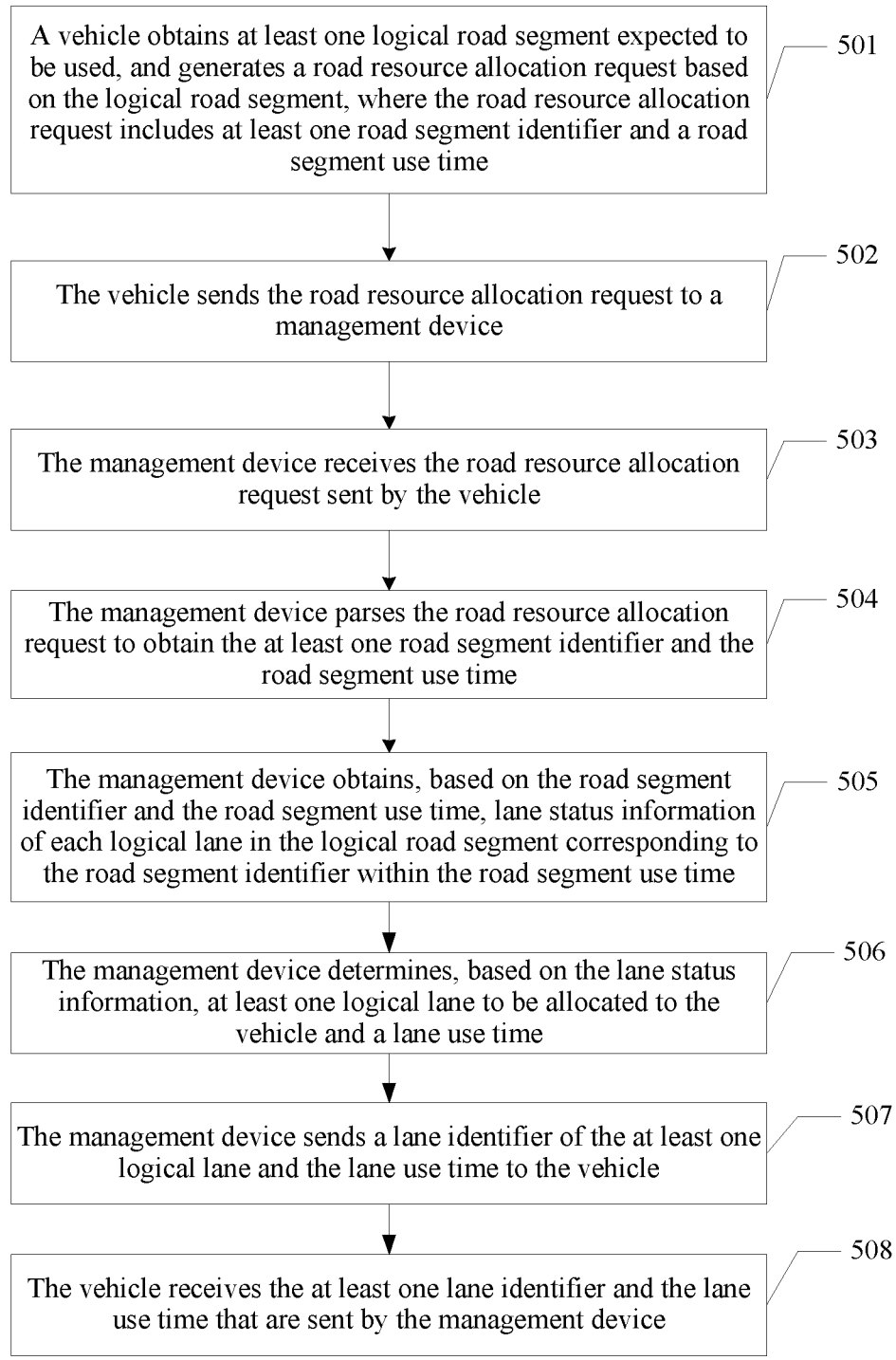
FIG. 5 is another schematic flowchart of a lane allocation method according to the present invention.

Referring to FIG. 5, an embodiment of the present invention provides a lane scheduling method, including the following operations.

Operation 501. A vehicle obtains at least one logical road segment expected to be used, and generates a road resource allocation request based on the logical road segment, where the road resource allocation request includes at least one road segment identifier and a road segment use time.

In this embodiment, when the vehicle needs to pass through one or more logical road segments of a road on which the vehicle moves, the vehicle obtains a logical road segment expected to be used, further obtains, through calculation based on a current location and a condition value such as a vehicle speed, a road segment use time of the logical road segment expected to be used, and generates a road resource allocation request based on the logical road segment and the road segment use time, where the road resource allocation request includes a road segment identifier and the road segment use time. Assuming that the vehicle needs to pass through a logical road segment BEa within 1:00:00 to 1:00:05, the road resource allocation request includes a road segment identifier BEa and a road segment use time 1:00:00 to 1:00:05.

Operation 502. The vehicle sends the road resource allocation request to a management device.

For details, refer to operation 402.

Operation 503. The management device receives the road resource allocation request sent by the vehicle.

For details, refer to operation 403.

Operation 504. The management device parses the road resource allocation request to obtain the at least one road segment identifier and the road segment use time.

In this embodiment, the management device parses the road resource allocation request to obtain the at least one road segment identifier (for example, the BEa) and the road segment use time (for example, 1:00:00 to 1:00:05) corresponding to the road segment identifier.

Operation 505. The management device obtains, based on the road segment identifier and the road segment use time, lane status information of each logical lane in the logical road segment corresponding to the road segment identifier within the road segment use time.

In this embodiment, based on the road segment identifier and the road segment use time, the lane status information of each logical lane in the logical road segment corresponding to the road segment identifier within the road segment use time is obtained, where the lane status information includes an idle state, an occupied state, and a reserved state. Assuming that a logical lane BEa 1 is not allocated by the management device to another vehicle within 1:00:00 to 1:00:05, and that no vehicle exists in the BEa 1, the BEa 1 is in the idle state; if a vehicle moves in a logical lane BEa 2, the BEa 2 is in the occupied state; if a logical lane BEa 3 is allocated to another vehicle within 1:00:00 to 1:00:05, the BEa 3 is in the reserved state.

Operation 506. The management device determines, based on the lane status information, at least one logical lane to be allocated to the vehicle and a lane use time.

In this embodiment, based on the lane status information obtained from the foregoing assumption, that is, the logical lane BEa 1 is in the idle state, the logical lane BEa 2 is in the occupied state, and the logical lane BEa 3 is in the reserved state, it is determined that the logical lane allocated to the vehicle is the BEa 1 and that the lane use time is from 1:00:00 to 1:00:05. If the lane status information is that the logical lane BEa 1 is in the occupied state from 1:00:00 to 1:00:03, and that the logical lane BEa 2 is in the occupied state from 1:00:00 to 1:00:05, and that the logical lane BEa 3 is in the reserved state, according to an optimal selection solution, a logical lane that should be allocated is the BEa 1 and the lane use time is from 1:00:03 to 1:00:08.

Operation 507. The management device sends a lane identifier of the at least one logical lane and the lane use time to the vehicle.

In this embodiment, the management device sends the lane identifier of the at least one logical lane and the lane use time to the vehicle. For example, the management device sends the lane identifier (BEa 1) of the logical lane and the lane use time (from 1:00:03 to 1:00:08) that are obtained in operation 506 to the vehicle corresponding to the road resource allocation request.

Operation 508. The vehicle receives the at least one lane identifier and the lane use time that are sent by the management device.

In this embodiment, the vehicle receives the at least one lane identifier and the lane use time that are sent by the management device, for example, the lane identifier (BEa 1) and the lane use time (from 1:00:03 to 1:00:08). A navigation device of the vehicle can find the logical lane corresponding to the BEa 1 from a traffic map, and display the lane use time, or automated driving is performed based on the lane use time to pass through the logical lane corresponding to the BEa 1. A specific manner is not limited.

In this embodiment of the present invention, a road resource allocated by the management device is precise to the logical lane in the logical road segment and the lane use time of the logical lane that the vehicle passes through. The road resource allocation precise to the lane and the moving time is more helpful for performing refined management of vehicles on the road.

In the foregoing embodiment, when the operation of allocating the road resource by the management device is refined, the lane status information in the logical road segment is critical to the road resource allocation. The following describes how the management device updates the lane status information of each logical lane in time.

Optionally, in some embodiments of the present invention, after the management device sends a road resource allocation response to the vehicle, the method further includes:

the management device sets the lane status information of the logical lane within the lane use time to the reserved state;

when the vehicle moves into the logical lane, the vehicle sends a move-in notification to the management device;

the management device receives the move-in notification sent by the vehicle;

the management device sets the lane status information of the logical lane within a remaining part of the lane use time to the occupied state based on the move-in notification;

when the vehicle moves out of the logical lane, the vehicle sends a move-out notification to the management device;

the management device receives the move-out notification sent by the vehicle; and the management device sets the lane status information of the logical lane within a remaining part of the lane use time to the idle state based on the move-out notification.

After sending the road resource allocation response to the vehicle, the management device sets the lane status information of the logical lane within the lane use time to the reserved state, so that the same logical lane is not allocated when another vehicle has a same request. This prevents two vehicles from moving into the same logical lane at the same time to cause an accident. When the vehicle moves into or moves out of the logical lane, the vehicle sends the move-in notification or the move-out notification, and the management device updates the lane status information based on the notifications. This helps the management device master conditions of the whole road in real time and allocate road resources more accurately.

Optionally, in some embodiments of the present invention, the lane scheduling method further includes:

when the vehicle does not move into the logical lane within the lane use time, the management device obtains new lane status information of the logical road segment;

the management device allocates a new road resource to the vehicle based on the new lane status information, and generates a first road resource update notification based on the new road resource, where the first road resource update notification includes an updated lane identifier and an updated lane use time, the updated lane identifier is used to identify a logical lane updated by the management device for the vehicle, and the updated lane use time indicates a time of using the updated logical lane by the vehicle;

the management device sends the first road resource update notification to the vehicle; and the vehicle receives the first road resource update notification sent by the management device.

In this embodiment of the present invention, when the vehicle does not move into the logical lane within the lane use time, it indicates that the vehicle may not move based on the road resource allocation response fed back by the management device. For example, the vehicle cannot move into the logical lane within the lane use time because the vehicle moves at a reduced speed before the logical lane. In this case, the new road resource needs to be reallocated to the vehicle based on the new lane status information, the first road resource update notification is generated, and the first road resource update notification is sent to the vehicle. Therefore, the vehicle can move through the logical road segment smoothly after receiving the first road resource update notification, and a requirement of the vehicle for the road resource is satisfied.

Optionally, in some embodiments of the present invention, the lane scheduling method further includes:

when the vehicle does not move out of the logical lane within the lane use time, the management device increases a duration of the lane use time, and generates a second road resource update notification;

the management device sends the second road resource update notification to the vehicle, where the second road resource update notification includes an updated lane use time, and the updated lane use time indicates an updated time of using the logical lane by the vehicle; and the vehicle receives the second road resource update notification sent by the management device.

In this embodiment of the present invention, if the vehicle moves into the logical lane based on the road resource allocation response, but a vehicle fault occurs, causing the vehicle to stop or move at a reduced speed, the vehicle cannot move out of the logical lane within the lane use time. The management device increases the lane use time of using the logical lane by the vehicle, generates the second road resource update notification, and sends the second road resource update notification to the vehicle, so that the vehicle can pass through the logical road segment based on the second road resource update notification. This improves flexibility of the management device in the lane scheduling process.

It should be noted that when the vehicle does not move out of the logical lane within the lane use time due to reduction of a vehicle speed, if a move-in time of a vehicle after the vehicle immediately follows the move-out time of the vehicle, the management device needs to send prompt information to the vehicle after the vehicle, so that the vehicle has a reaction time for performing an operation such as reducing a speed or stopping the vehicle to avoid a rear-end collision.

Optionally, in some embodiments of the present invention, the lane scheduling method further includes:

when the reserved state of the logical lane changes before the lane use time, the management device obtains new lane status information of the logical road segment;

the management device allocates a new road resource to the vehicle based on the new lane status information, and generates a third road resource update notification based on the new road resource, where the third road resource update notification includes an updated lane identifier and an updated lane use time, the updated lane identifier is used to identify a logical lane updated by the management device for the vehicle, and the updated lane use time indicates a time of using the updated logical lane by the vehicle;

the management device sends the third road resource update notification to the vehicle; and the vehicle receives the third road resource update notification sent by the management device.

In this embodiment of the present invention, when the reserved state of the logical lane changes before the lane use time, for example, if a move-in time in the lane use time is 1:00, but a vehicle fault occurs in the logical lane at 0:50, and a maintenance time reported by vehicle maintenance personnel is 0:55 to 2:00, where the lane use time is included in the maintenance time, inevitably no vehicle can move in the logical lane within the lane use time. In this case, the reserved state of the logical lane within the lane use time is changed to the occupied state, the logical lane allocated to the vehicle and the lane use time are updated, the third road resource update notification is generated, and the third road resource update notification is sent to the vehicle, so that the vehicle can avoid using the previously allocated logical lane and change to another logical lane to pass through the logical road segment smoothly. Therefore, safety is improved.

Optionally, in some embodiments of the present invention, the management device synchronizes information of the logical road segment and the logical lane with the vehicle, where the information of the logical road segment and the logical lane includes the road segment identifier of the logical road segment, the lane identifier of the logical lane, the road segment corresponding to the logical road segment, and the lane segment corresponding to the logical lane.

In this embodiment of the present invention, if the information of the logical road segment and the logical lane changes due to road reconstruction, for example, if lane identifiers of logical lanes in the logical road segment BEa are renumbered to change the original BEa 1 to the BEa 3, and the original BEa 3 to the BEa 1, a change is caused to a traffic map of the management device. However, the traffic map of the vehicle needs to be consistent with that of the management device, so that the management device can allocate a required road resource to the vehicle accurately.

It should be noted that the management device may adjust a length of the logical road segment based on a condition such as traffic or a road condition. Using the road condition as an example, for example, in sunny weather, a safe trailing distance between two adjacent vehicles on a highway in a good condition is about 50 m, and a length of a logical road segment is adjusted to 60 m; in a weather condition with rain, snow, strong wind, or the like, a safe trailing distance between two adjacent vehicles on a highway in a complex condition is about 100 m, and a length of a logical road segment is adjusted to 100 m automatically. The length of the logical road segment is not shorter than the safe trailing distance between two adjacent vehicles. The management device updates the logical lane information of the logical road segment based on the length of the logical road segment. A theory obtained in a specific implementation process is that if the length of the logical road segment is closer to the safe trailing distance between two adjacent vehicles, utilization of the road resources can be better improved.

It should be noted that if the vehicle needs to pass through a natural road segment BE, logical road segments expected to be used are the BEa, BEb, and BEc; assuming that the vehicle requires the management device to allocate road resources of all the logical road segments at a time, the road segment identifier included in the road resource allocation request is an identifier sequence that is BEa-BEb-BEc in sequence, and the road segment use time is a road segment use time sequence corresponding to the road segment identifier sequence or a total time of moving through the logical road segments by the vehicle. The road segment use time may be indicated by a road segment use time sequence 1:00:00-1:00:05-1:00:10-1:00:15 or a total time from 1:00:00 to 1:15. Likewise, the lane identifier and the lane use time may also be indicated in this way.

It should be noted that the road segment use time includes a move-in time of moving into the logical road segment and a move-out time of moving out of the logical road segment, or a move-in time of moving into the logical road segment and a duration of moving through the logical road segment, or a move-out time of moving out of the logical road segment and a duration of moving through the logical road segment. To be specific, the road segment use time of the logical road segment BEa may be indicated by the move-in time 1:00:00 and the move-out time 1:00:05, or may be indicated by the move-in time 1:00:00 and the duration 5 seconds of moving through the BEa. Likewise, the lane use time may also be indicated in the same way as the road segment use time.

It should be noted that when there are at least two logical road segments, each road segment identifier in the road resource allocation request needs to correspond to one lane identifier in the road resource allocation response, so that the vehicle can pass smoothly. In a lane identifier sequence, two adjacent lane identifiers may identify one natural lane or two adjacent natural lanes. For example, logical lanes allocated to the vehicle are the BEa 1 and the BEb 2, and it is feasible for the vehicle to change from the natural lane BE 1 to the BE 2. However, if logical lanes allocated to the vehicle are the BEa 1 and a BEb 3, when the vehicle needs to move out of the BEa 1, it is relatively dangerous and not allowed for the vehicle to change from the natural lane BE 1 to the BE 3 and cross a lane. The management device needs to automatically exclude this when allocating a road resource.

The lane scheduling methods according to the present invention are described in the foregoing embodiments. The following describes apparatus embodiments of a vehicle and a management device in detail.

Figure 6:
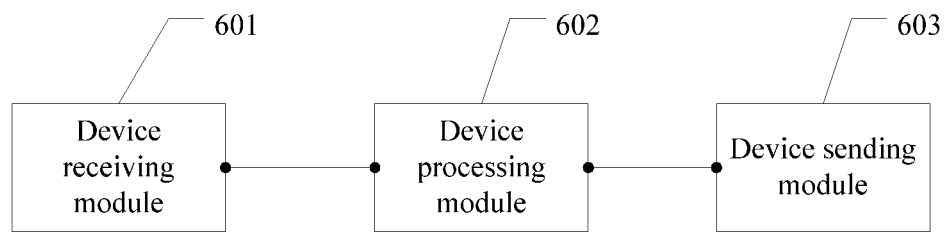
FIG. 6 is a schematic structural diagram of a management device according to the present invention.

Referring to FIG. 6, an embodiment of the present invention provides a management device, including:

a device receiving module 601, configured to receive a road resource allocation request sent by a vehicle, where the road resource allocation request includes at least one road segment identifier, the road segment identifier is used to identify a logical road segment expected to be used by the vehicle, the logical road segment is a logical segment of a road on which the vehicle moves, the logical segmentation segments a lane included in the road into logical lanes, and the logical road segment includes at least one logical lane;

a device processing module 602, configured to allocate a road resource to the vehicle based on the road resource allocation request, where the road resource includes at least one logical lane corresponding to the at least one road segment identifier; and a device sending module 603, configured to send a lane identifier of the at least one logical lane to the vehicle.

In this embodiment of the present invention, when the vehicle needs to pass through one or several continuous logical road segments, after the device receiving module 601 receives the road resource allocation request sent by the vehicle, the device processing module 602 allocates the road resource to the vehicle that sends the request, and the device sending module 603 sends the allocated road resource to the vehicle based on the allocated road resource, that is, the lane identifier of the at least one logical lane. Therefore, the vehicle can be instructed to pass through the logical lane corresponding to the lane identifier by automated driving, assisted driving, or manual driving based on the lane identifier. In comparison with the prior art, by dividing the road into logical road segments, the management device can allocate, to the vehicle, a logical lane in each logical road segment for moving, and can implement refined management of the vehicle on the road. Therefore, the management device can allocate road resources globally to improve utilization of road resources, and adjust density of vehicles in different lanes on the road to enhance safety of vehicles moving on the road.

Optionally, in some embodiments of the present invention, the device processing module 602 is specifically configured to parse the road resource allocation request to obtain the road segment identifier;

the device processing module 602 is further configured to obtain, based on the road segment identifier, lane status information of each logical lane in the logical road segment corresponding to the road segment identifier, where the lane status information includes an idle state, an occupied state, and a reserved state; and the device processing module 602 is further configured to determine, based on the lane status information, a logical lane to be allocated to the vehicle.

In this embodiment of the present invention, after the device receiving module 601 receives the road resource allocation request, the device processing module 602 parses the road resource allocation request to obtain the road segment identifier, finds the corresponding logical road segment from a traffic map based on the road segment identifier, and obtains the lane status information of each logical lane in the logical road segment, where the lane status information includes the idle state, the occupied state, and the reserved state; and the device processing module 602 may determine, based on a current status in the lane status information, a logical lane in which the vehicle moves when the vehicle passes through the logical road segment. Because the road resource is allocated based on the lane status information, the vehicle can accurately avoid choosing a logical lane in which a vehicle exists from the logical road segment, but choose an idle logical lane in which no vehicle exists. This improves utilization of road resources.

Optionally, in some embodiments of the present invention, the device processing module 602 is further configured to set the lane status information of the logical lane to the reserved state;

the device receiving module 601 is further configured to receive, when the vehicle moves into the logical lane, a move-in notification sent by the vehicle;

the device processing module 602 is further configured to set the lane status information of the logical lane to the occupied state based on the move-in notification;

the device receiving module 601 is further configured to receive, when the vehicle moves out of the logical lane, a move-out notification sent by the vehicle; and the device processing module 602 is further configured to set the lane status information of the logical lane to the idle state based on the move-out notification.

In this embodiment of the present invention, after the device sending module 603 sends a road resource allocation response to the vehicle, the device processing module 602 sets the lane status information of the logical lane to the reserved state; when the vehicle moves into or moves out of the logical lane, the vehicle sends the move-in notification or the move-out notification; and the device processing module 602 updates the lane status information of the logical lane based on the notifications received by the device receiving module 601. This helps the management device master conditions of the whole road in real time and allocate road resources more accurately.

Optionally, in some embodiments of the present invention, the road resource allocation request further includes a road segment use time, and the road segment use time indicates an expected time of using the logical road segment by the vehicle;

the device processing module 602 is specifically configured to obtain the road segment identifier and the road segment use time based on the road resource allocation request;

the device processing module 602 is further configured to obtain, based on the road segment identifier and the road segment use time, the lane status information of each logical lane in the logical road segment corresponding to the road segment identifier within the road segment use time; and the device processing module 602 is further configured to determine, based on the lane status information, the logical lane to be allocated to the vehicle and a lane use time, where the lane use time indicates a time allocated by the management device to the vehicle for using the logical lane.

In this embodiment of the present invention, if the vehicle needs to pass through the logical road segment in an expected time period, the road resource allocation request further includes the road segment use time; and the road resource allocated by the device processing module 602 is precise to the logical lane in the logical road segment and the lane use time of the logical lane that the vehicle passes through. The road resource allocation precise to the lane and the moving time is more helpful for performing refined management of vehicles on the road.

Optionally, in some embodiments of the present invention, the device processing module 602 is further configured to set the lane status information of the logical lane within the lane use time to the reserved state;

the device receiving module 601 is further configured to receive, by the management device when the vehicle moves into the logical lane, a move-in notification sent by the vehicle;

the device processing module 602 is further configured to set the lane status information of the logical lane within a remaining part of the lane use time to the occupied state based on the move-in notification;

the device receiving module 601 is further configured to receive, by the management device when the vehicle moves out of the logical lane, a move-out notification sent by the vehicle; and the device processing module 602 is further configured to set the lane status information of the logical lane within a remaining part of the lane use time to the idle state based on the move-out notification.

In this embodiment of the present invention, after the device sending module 603 sends the lane identifier and the lane use time to the vehicle, the device processing module 602 sets the lane status information of the logical lane within the lane use time to the reserved state, so that the device processing module 602 does not allocate the same logical lane when another vehicle has a same request. This prevents two vehicles from moving into the same logical lane to cause an accident. When the vehicle moves into or moves out of the logical lane, the vehicle sends the move-in notification or the move-out notification, and the device processing module 602 updates the lane status information based on the notifications received by the device receiving module 601. This helps the management device master conditions of the whole road in real time and allocate road resources more accurately.

Optionally, in some embodiments of the present invention, the device processing module 602 is further configured to obtain new lane status information of the logical road segment when the vehicle does not move into the logical lane within the lane use time;

the device processing module 602 is further configured to allocate a new road resource to the vehicle based on the new lane status information, and generate a first road resource update notification based on the new road resource, where the first road resource update notification includes an updated lane identifier and an updated lane use time, the updated lane identifier is used to identify a logical lane updated by the management device for the vehicle, and the updated lane use time indicates a time of using the updated logical lane by the vehicle; and the device sending module 603 is further configured to send the first road resource update notification to the vehicle.

In this embodiment of the present invention, when the vehicle does not move into the logical lane within the lane use time, it indicates that the vehicle may not move based on the road resource allocation response fed back by the management device. For example, the vehicle cannot move into the logical lane within the lane use time because the vehicle moves at a reduced speed before the logical lane. In this case, the device processing module 602 needs to reallocate the new road resource to the vehicle based on the new lane status information, and generate the first road resource update notification; and the device sending module 603 sends the first road resource update notification to the vehicle, to satisfy a requirement of the vehicle for the road resource.

Optionally, in some embodiments of the present invention, the device processing module 602 is further configured to: when the vehicle does not move out of the logical lane within the lane use time, increase a duration of the lane use time, and generate a second road resource update notification; and the device sending module 603 is further configured to send the second road resource update notification to the vehicle, where the second road resource update notification includes an updated lane use time, and the updated lane use time indicates an updated time of using the logical lane by the vehicle.

In this embodiment of the present invention, if the vehicle moves into the logical lane based on a move-in time in the lane use time, but a vehicle fault occurs, causing the vehicle to stop or move at a reduced speed, the vehicle cannot move out of the logical lane within the lane use time. The device processing module 602 increases the lane use time of using the logical lane by the vehicle, and generates the second road resource update notification; and the device sending module 603 sends the second road resource update notification to the vehicle. This improves flexibility of the management device in the lane scheduling process.

Optionally, in some embodiments of the present invention, the device processing module 602 is further configured to obtain new lane status information of the logical road segment when the reserved state of the logical lane changes before the lane use time;

the device processing module 602 is further configured to allocate a new road resource to the vehicle based on the new lane status information, and generate a third road resource update notification based on the new road resource, where the third road resource update notification includes an updated lane identifier and an updated lane use time, the updated lane identifier is used to identify a logical lane updated by the management device for the vehicle, and the updated lane use time indicates a time of using the updated logical lane by the vehicle; and the device sending module 603 is further configured to send the third road resource update notification to the vehicle.

In this embodiment of the present invention, when the reserved state of the logical lane changes before the lane use time, for example, if a vehicle fault occurs in the logical lane, and vehicle maintenance personnel report a maintenance time, where the lane use time is included in the maintenance time, no vehicle can move in the logical lane within the lane use time. In this case, the device processing module 602 sets the reserved state of the logical lane within the lane use time to the occupied state; the device processing module 602 updates the logical lane allocated to the vehicle and the lane use time, and generates the third road resource update notification; and the device sending module 603 sends the third road resource update notification to the vehicle, so that the vehicle can avoid using the previously allocated logical lane and change to another logical lane to pass through the logical road segment smoothly. Therefore, safety is improved.

Figure 7:
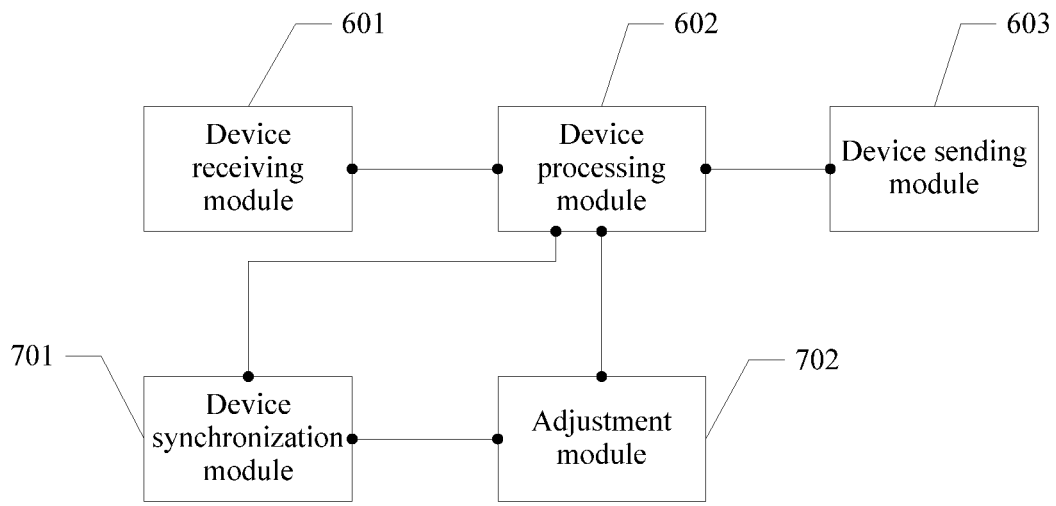
FIG. 7 is another schematic structural diagram of a management device according to the present invention.

Optionally, referring to FIG. 7, in some embodiments of the present invention, the management device further includes a device synchronization module 701, where the device synchronization module 701 is configured to synchronize information of the logical road segment and the logical lane with the vehicle, where the information of the logical road segment and the logical lane includes the road segment identifier of the logical road segment, the lane identifier of the logical lane, the road segment corresponding to the logical road segment, and the lane segment corresponding to the logical lane.

In this embodiment of the present invention, if the information of the logical road segment and the logical lane changes due to road reconstruction, for example, if a lane is added or the road segment identifier and the lane identifier are renumbered, a change is caused to a traffic map of the management device. However, the vehicle needs to synchronize its traffic map with that of the management device, so that the management device can allocate a required road resource to the vehicle accurately.

Optionally, referring to FIG. 7, in some embodiments of the present invention, the management device further includes an adjustment module 702, where the adjustment module 702 is configured to adjust a length of the logical road segment, where the length of the logical road segment is not less than a safe trailing distance between two adjacent vehicles; and the device processing module 602 is further configured to update the information of the logical road segment and the logical lane based on the length of the logical road segment.

In this embodiment of the present invention, the adjustment module 702 may adjust the length of the logical road segment based on a condition such as traffic or a road condition. Because the length of the logical road segment is adjusted flexibly, road resources are used more flexibly. In addition, if the length is closer to the safe trailing distance between two adjacent vehicles, it is more helpful for utilization of the road resources.

Figure 8:
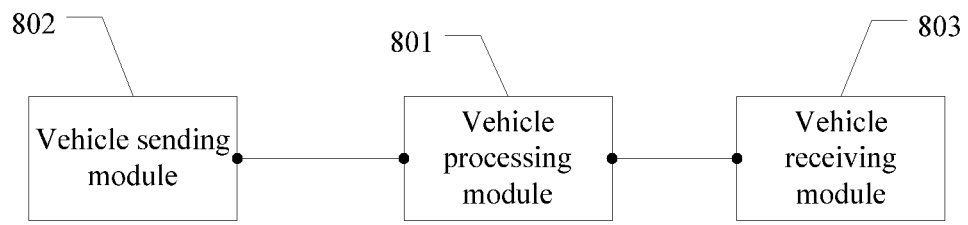
FIG. 8 is a schematic structural diagram of a vehicle according to the present invention.

Referring to FIG. 8, an embodiment of the present invention provides a vehicle, including:

a vehicle processing module 801, configured to obtain at least one logical road segment expected to be used, and generate a road resource allocation request based on the logical road segment, where the road resource allocation request includes at least one road segment identifier, the road segment identifier is used to identify a logical road segment expected to be used by the vehicle, the logical road segment is a logical segment of a road on which the vehicle moves, the logical segmentation segments a lane included in the road into logical lanes, and the logical road segment includes at least one logical lane;

a vehicle sending module 802, configured to send the road resource allocation request to a management device; and a vehicle receiving module 803, configured to receive at least one lane identifier sent by the management device, where the lane identifier is used to identify a logical lane allocated by the management device to the vehicle for use, and the logical lane belongs to the logical road segment.

In this embodiment of the present invention, when the vehicle needs to pass through a road segment, the vehicle processing module 801 generates the road resource allocation request; the vehicle sending module 802 sends the request to the management device; and the vehicle receiving module 803 receives the at least one lane identifier that is fed back. Therefore, the vehicle can pass through the logical lane corresponding to the lane identifier by automated driving, assisted driving, or manual driving based on the lane identifier. In comparison with the prior art, by dividing the road into logical road segments, the management device can allocate, to the vehicle, a logical lane in each logical road segment for moving, and can implement refined management of the vehicle on the road. Therefore, the management device can allocate road resources globally to improve utilization of road resources, and adjust density of vehicles in different lanes on the road to enhance safety of vehicles moving on the road.

Optionally, in some embodiments of the present invention, the vehicle sending module 802 is further configured to send a move-in notification to the management device when the vehicle moves into the logical lane; and the vehicle sending module 802 is further configured to send a move-out notification to the management device when the vehicle moves out of the logical lane.

In this embodiment of the present invention, when the vehicle moves into or moves out of the logical lane, the vehicle sending module 802 sends the move-in notification or the move-out notification, so that the management device can update lane status information of the logical lane in time based on the notifications. This helps the management device master conditions of the whole road in real time and allocate road resources more accurately.

Optionally, in some embodiments of the present invention, the road resource allocation request further includes a road segment use time, and the road segment use time indicates an expected time of using the logical road segment by the vehicle; and the vehicle receiving module 803 is further configured to receive a lane use time sent by the management device, where the lane use time indicates a time allocated by the management device to the vehicle for using the logical lane.

If the vehicle needs to pass through the logical road segment in an expected time period, when receiving the lane identifier, the vehicle receiving module 803 further receives the lane use time of the logical lane corresponding to the lane identifier; and a road resource allocated by the management device is precise to the logical lane in the logical road segment and the lane use time of the logical lane that the vehicle passes through. The road resource allocation precise to the lane and the moving time is more helpful for performing refined management of vehicles on the road.

Optionally, in some embodiments of the present invention, the vehicle receiving module 803 is further configured to receive a first road resource update notification sent by the management device, where the first road resource update notification includes an updated lane identifier and an updated lane use time, the updated lane identifier is used to identify a logical lane updated by the management device for the vehicle, and the updated lane use time indicates a time updated by the management device for the vehicle to use the updated logical lane;

the vehicle receiving module 803 is further configured to receive a second road resource update notification sent by the management device, where the second road resource update notification includes an updated lane use time, and the updated lane use time indicates an updated time of using the logical lane by the vehicle; or the vehicle receiving module 803 is further configured to receive a third road resource update notification sent by the management device, where the third road resource update notification includes an updated lane identifier and an updated lane use time, the updated lane identifier is used to identify a logical lane updated by the management device for the vehicle, and the updated lane use time indicates a time updated by the management device for the vehicle to use the updated logical lane.

In this embodiment of the present invention, if the vehicle is abnormal and does not move based on an allocation response of the management device, the management device reallocates a new road resource to the vehicle, and the vehicle receiving module 803 can receive the road resource update notification sent by the management device, so that the vehicle can pass through the logical road segment based on the road resource update notification. Therefore, a requirement of the vehicle for the road resource is satisfied.

Figure 9:
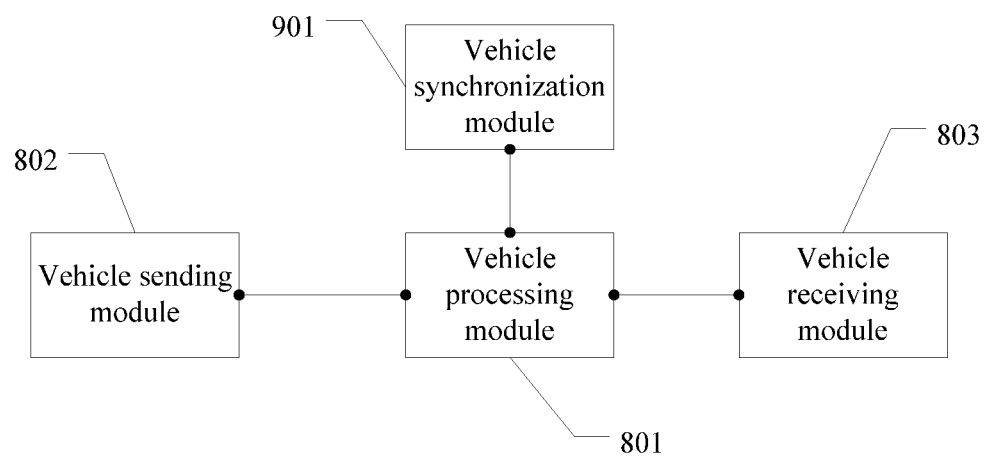
FIG. 9 is another schematic structural diagram of a vehicle according to the present invention.

Optionally, referring to FIG. 9, the vehicle further includes a vehicle synchronization module 901, where the vehicle synchronization module 901 is configured to synchronize information of the logical road segment and the logical lane with the management device, where the information of the logical road segment and the logical lane includes the road segment identifier of the logical road segment, the lane identifier of the logical lane, the road segment corresponding to the logical road segment, and the lane segment corresponding to the logical lane.

In this embodiment of the present invention, if the information of the logical road segment and the logical lane changes due to road reconstruction, for example, if a lane is added or the road segment identifier and the lane identifier are renumbered, a change is caused to a traffic map of the management device. However, the vehicle needs to synchronize its traffic map with that of the management device, so that the management device can allocate a required road resource to the vehicle accurately.

Figure 10:
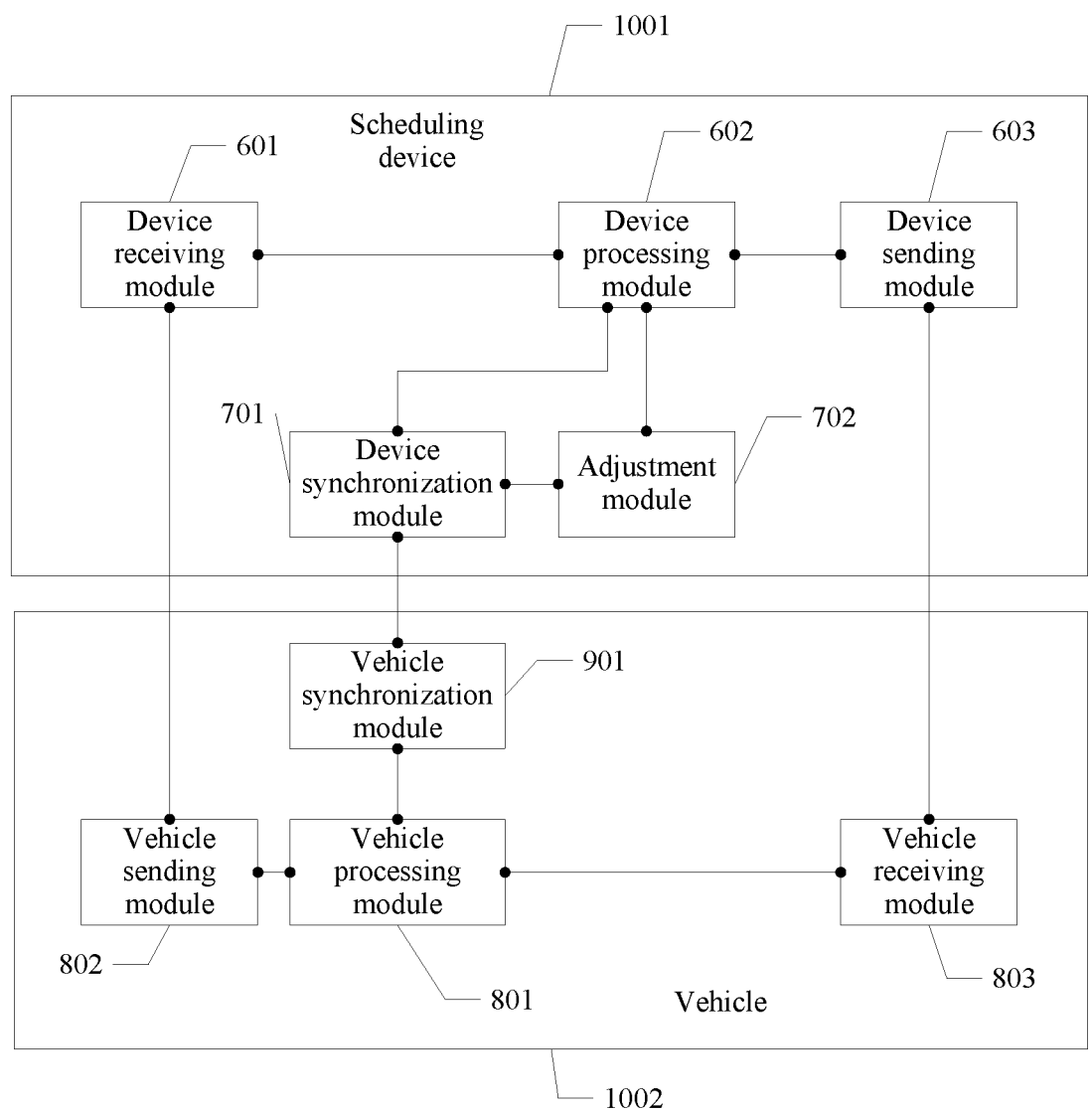
FIG. 10 is a schematic structural diagram of interaction between apparatuses in a vehicle and a management device according to the present invention.

Referring to FIG. 10, an embodiment of interaction between modules in a vehicle and a management device is as follows:

A vehicle processing module 801 in a vehicle 1002 generates a road resource allocation request, where the road resource allocation request includes at least one road segment identifier; a vehicle sending module 802 sends the road resource allocation request to a management device; a device receiving module 601 in the management device 1001 receives the road resource allocation request sent by the vehicle sending module 802; a device processing module 602 allocates a road resource based on the received road resource allocation request, where the road resource includes at least one logical lane corresponding to the at least one road segment identifier; a device sending module 603 sends a lane identifier of the at least one logical lane to the vehicle; and a vehicle receiving module 803 receives the at least one lane identifier sent by the device sending module 603.

It should be noted that after an adjustment module 702 of the management device 1001 adjusts a length of a logical road segment, the device processing module 602 needs to update information of the logical road segment and the logical lane, and the vehicle 1002 synchronizes the information of the logical road segment and the logical lane with the management device 1001 by using a connection between a vehicle synchronization module 901 and a device synchronization module 701.

The foregoing has described an embodiment of a modular structure of the management device. The following describes a physical apparatus of a management device.

Referring to FIG. 11, an embodiment of the present invention provides a management device, including:

a wireless network interface 1150, a CPU 1122, and a memory 1132, where the wireless network interface 1150, the CPU 1122, and the memory 1103 are interconnected by a bus, the memory 1132 stores a computer instruction, and the CPU 1122 implements the following method by executing the computer instruction:

receiving, by the wireless network interface 1150, a road resource allocation request sent by a vehicle, where the road resource allocation request includes at least one road segment identifier, the road segment identifier is used to identify a logical road segment expected to be used by the vehicle, the logical road segment is a logical segment of a road on which the vehicle moves, the logical segmentation segments a lane included in the road into logical lanes, and the logical road segment includes at least one logical lane;

allocating, by the CPU 1122, a road resource to the vehicle based on the road resource allocation request, where the road resource includes at least one logical lane corresponding to the at least one road segment identifier; and sending, by the wireless network interface 1150, a lane identifier of the at least one logical lane to the vehicle.

Optionally, in some embodiments of the present invention, the CPU 1122 may further implement the following method by executing the computer instruction:

obtaining the road segment identifier based on the road resource allocation request;

obtaining, based on the road segment identifier, lane status information of each logical lane in the logical road segment corresponding to the road segment identifier, where the lane status information includes an idle state, an occupied state, and a reserved state; and determining, based on the lane status information, a logical lane to be allocated to the vehicle.

It should be noted that, for ease of description, the foregoing method embodiments are described as a series of action combinations. However, a person skilled in the art should understand that the present invention is not limited to the described sequence of the actions, because some operations may be performed in another sequence or performed at the same time according to the present invention. In addition, a person skilled in the art should also appreciate that all the embodiments described in the specification are example embodiments, and the related actions and modules are not necessarily mandatory to the present invention.

A person of ordinary skill in the art may understand that all or a part of the operations of the methods in the embodiments may be implemented by a program instructing relevant hardware. The program may be stored in a computer readable storage medium. The storage medium may include: a ROM, a RAM, a magnetic disk, or an optical disc.

A data transmission method, an access network device, and user equipment provided by the embodiments of the present invention are described in detail above. Although the principles and implementations of the present invention are described with reference to specific examples in the specification, the description of the embodiments is only intended to help understand the method and core idea of the present invention. In addition, a person of ordinary skill in the art may make modifications and variations with respect to the specific implementations and application scopes of the present invention according to the idea of the present invention. Therefore, the specification shall not be construed as a limitation on the present invention.

What is claimed is:

1. A lane scheduling method, comprising:

receiving, by a management device, a road resource allocation request from a vehicle, wherein the road resource allocation request comprises at least one road segment identifier that identifies a logical road segment expected to be used by the vehicle, the logical road segment is a logical segment of a road on which the vehicle moves, wherein a lane comprised in the road is logically segmented into a plurality of logical lanes, and the logical road segment comprises at least one of the logical lanes;

allocating, by the management device, a road resource to the vehicle based on the road resource allocation request, wherein the road resource comprises at least one logical lane corresponding to the at least one road segment identifier; and sending, by the management device, a lane identifier of the at least one logical lane to the vehicle.

2. The lane scheduling method according to claim 1, wherein the allocating, by the management device, a road resource to the vehicle based on the road resource allocation request comprises:

parsing, by the management device, the road resource allocation request to obtain the road segment identifier;

obtaining, by the management device based on the road segment identifier, lane status information of each logical lane in the logical road segment corresponding to the road segment identifier, wherein the lane status information comprises an idle state, an occupied state, or a reserved state; and determining, by the management device based on the lane status information, a logical lane to be allocated to the vehicle.

3. The lane scheduling method according to claim 2, wherein after the allocating, by the management device, a road resource to the vehicle based on the road resource allocation request, the method further comprises:

setting, by the management device, the lane status information of the logical lane to the reserved state;

when the vehicle moves into the logical lane, receiving, by the management device, a move-in notification from the vehicle;

setting, by the management device, the lane status information of the logical lane to the occupied state based on the move-in notification;

when the vehicle moves out of the logical lane, receiving, by the management device, a move-out notification from the vehicle; and setting, by the management device, the lane status information of the logical lane to the idle state based on the move-out notification.

4. The lane scheduling method according to claim 2, wherein the road resource allocation request further comprises a road segment use time, and the road segment use time indicates an expected time of using the logical road segment by the vehicle; and the allocating, by the management device, a road resource to the vehicle based on the road resource allocation request comprises:

obtaining, by the management device, the road segment identifier and the road segment use time based on the road resource allocation request;

obtaining, by the management device based on the road segment identifier and the road segment use time, the lane status information of each logical lane in the logical road segment corresponding to the road segment identifier within the road segment use time; and determining, by the management device based on the lane status information, the logical lane to be allocated to the vehicle and a lane use time, wherein the lane use time indicates a time allocated by the management device to the vehicle for using the logical lane.

5. The lane scheduling method according to claim 4, wherein after the allocating, by the management device, a road resource to the vehicle based on the road resource allocation request, the method further comprises:

setting, by the management device, the lane status information of the logical lane within the road segment use time to the reserved state;

when the vehicle moves into the logical lane, receiving, by the management device, a move-in notification from the vehicle;

setting, by the management device, the lane status information of the logical lane within a remaining part of the lane use time to the occupied state based on the move-in notification;

when the vehicle moves out of the logical lane, receiving, by the management device, a move-out notification from the vehicle; and setting, by the management device, the lane status information of the logical lane within a remaining part of the lane use time to the idle state based on the move-out notification.

6. The lane scheduling method according to claim 1, further comprising:

synchronizing, by the management device, information of the logical road segment and the logical lane with the vehicle, wherein the information of the logical road segment and the logical lane comprises the road segment identifier of the logical road segment, the lane identifier of the logical lane, the road segment corresponding to the logical road segment, and the lane segment corresponding to the logical lane.

7. The lane scheduling method according to claim 6, further comprising:

adjusting, by the management device, a length of the logical road segment, wherein the length of the logical road segment is not less than a safe trailing distance between two adjacent vehicles; and updating, by the management device, the information of the logical road segment and the logical lane based on the length of the logical road segment.

8. A method for obtaining lane information, comprising:

obtaining at least one logical road segment expected to be used, and generating a road resource allocation request based on the logical road segment, wherein the road resource allocation request comprises at least one road segment identifier, the road segment identifier is used to identify a logical road segment expected to be used by the vehicle, the logical road segment is a logical segment of a road on which the vehicle moves, wherein a lane comprised in the road is logically segmented into a plurality of logical lanes, and the logical road segment comprises at least one of the logical lanes;

sending a road resource allocation request to a management device; and receiving at least one lane identifier from the management device, wherein the lane identifier is used to identify a logical lane allocated by the management device to the vehicle for use, and the logical lane belongs to the logical road segment.

9. The method according to claim 8, wherein the road resource allocation request further comprises a road segment use time, and the road segment use time indicates an expected time of using the logical road segment by the vehicle; and the method further comprises:

receiving a lane use time from the management device, wherein the lane use time indicates a time allocated by the management device to the vehicle for using the logical lane.

10. The method according to claim 9, wherein:

the road segment use time comprises a move-in time of moving into the logical road segment and a move-out time of moving out of the logical road segment, or the move-in time of moving into the logical road segment and a duration of moving through the logical road segment, or the move-out time of moving out of the logical road segment and the duration of moving through the logical road segment; and the lane use time comprises a move-in time of moving into the logical lane and a move-out time of moving out of the logical lane, or the move-in time of moving into the logical lane and a duration of moving through the logical lane, or the move-out time of moving out of the logical lane and the duration of moving through the logical lane.

11. A vehicle, comprising:

a memory to store instructions;

a central processing unit (CPU) coupled to the memory to implement the instructions;

wherein, the CPU based on the instructions is configured to: obtain at least one logical road segment expected to be used, and generate a road resource allocation request based on the logical road segment, wherein the road resource allocation request comprises at least one road segment identifier used to identify a logical road segment expected to be used by the vehicle, the logical road segment is a logical segment of a road on which the vehicle moves, wherein a lane comprised in the road is logically segmented into a plurality of logical lanes, and the logical road segment comprises at least one of the logical lanes;

wireless network interface configured to send the road resource allocation request to a management device; and wherein, the wireless network interface is configured to receive at least one lane identifier from the management device, wherein the lane identifier is used to identify a logical lane allocated by the management device to the vehicle for use, and the logical lane belongs to the logical road segment.

12. The vehicle according to claim 11, wherein the road resource allocation request further comprises a road segment use time, and the road segment use time indicates an expected time of using the logical road segment by the vehicle; and the CPU is further configured to receive a lane use time from the management device, wherein the lane use time indicates a time allocated by the management device to the vehicle for using the logical lane.

13. The vehicle according to claim 11, wherein the CPU is further configured to synchronize information of the logical road segment and the logical lane with the management device, wherein the information of the logical road segment and the logical lane comprises the road segment identifier of the logical road segment, the lane identifier of the logical lane, the road segment corresponding to the logical road segment, and the lane segment corresponding to the logical lane.

14. A management device, comprising:

a wireless network interface, a central processing unit CPU, and a memory, wherein the wireless network interface, the CPU, and the memory are interconnected by a bus, the memory stores computer instructions, and the CPU implements the method in claim 1 by executing the computer instructions.

\* \* \* \* \*